(12) United States Patent
Omori et al.

(10) Patent No.: US 6,426,932 B2
(45) Date of Patent: *Jul. 30, 2002

(54) DISK DEVICE

(75) Inventors: Kiyoshi Omori, Tokyo; Ryuzo Tamayama, Kanagawa, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,328

(22) Filed: Jun. 5, 1998

(30) Foreign Application Priority Data

| Jun. 6, 1997 | (JP) | ......... P09-149182 |
| Jun. 6, 1997 | (JP) | ......... P09-149183 |
| Jun. 6, 1997 | (JP) | ......... P09-149184 |
| Jun. 6, 1997 | (JP) | ......... P09-149185 |

(51) Int. Cl.[7] ............................... G11B 33/02
(52) U.S. Cl. ............................................ 369/75.1
(58) Field of Search ........................ 369/75.1, 77.1, 369/77.2, 75.2; 360/97.02, 97.04, 98.02, 98.06

(56) References Cited

U.S. PATENT DOCUMENTS

| 4,642,715 A | * | 2/1987 | Ende ........................... 360/97 |
| 4,672,509 A | * | 6/1987 | Speraw ........................ 361/384 |
| 5,086,422 A | * | 2/1992 | Hagiya et al. ............. 369/75.1 |
| 5,231,623 A | * | 7/1993 | Kanno et al. .............. 369/75.2 |
| 5,255,256 A | * | 10/1993 | Engler et al. ............. 369/77.2 |
| 5,301,178 A | * | 4/1994 | Okabe et al. .............. 369/77.1 |
| 5,335,217 A | * | 8/1994 | Kaneda et al. ............. 369/77.2 |
| 5,418,775 A | * | 5/1995 | Okatani ................... 369/275.5 |
| 5,557,595 A | * | 9/1996 | Ishii ........................ 369/77.1 |
| 5,820,236 A | * | 10/1998 | Aoki ....................... 312/223.2 |

FOREIGN PATENT DOCUMENTS

| JP | 03269892 A | * | 12/1991 |
| JP | 07326182 A | * | 12/1995 |

* cited by examiner

*Primary Examiner*—David Hudspeth
*Assistant Examiner*—Angel Castro
(74) *Attorney, Agent, or Firm*—Oblon, Spivak, McClelland, Maier & Neustadt, P.C.

(57) ABSTRACT

Disclosed is a disk device which can avoid as far as possible dirt and dust from being sucked into a disk device body together with open air. An intake port is formed in a front panel of a disk device body along a lower edge of a tray entrance/exit opening. An intake passage formed between printed boards in the disk device body and a lower cover thereof is communicated at a front end thereof with the intake port. A discharge port opened to the outside of the lower cover is formed in the intake passage.

7 Claims, 35 Drawing Sheets

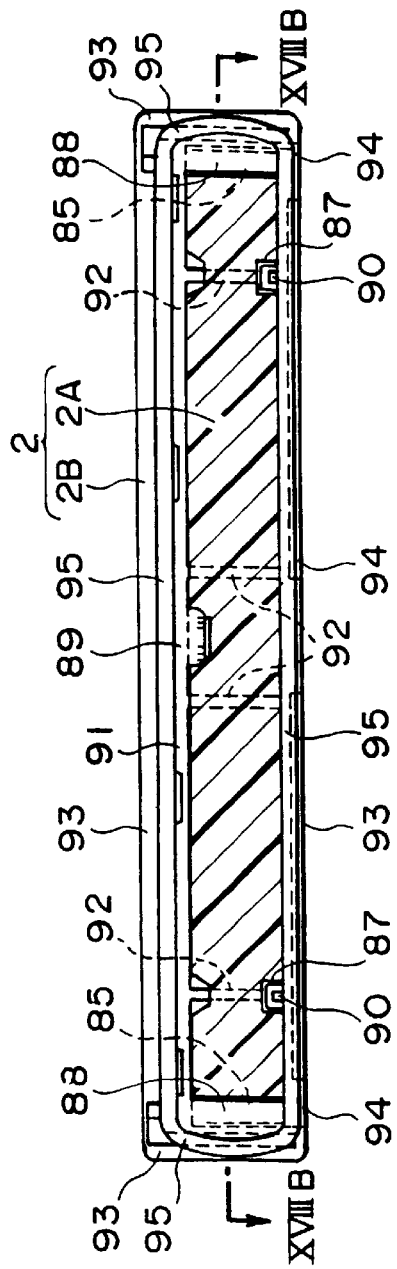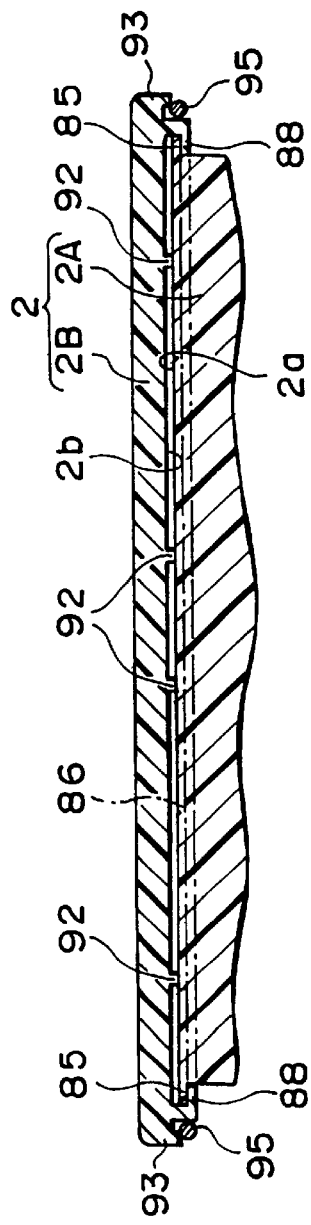

DISK DEVICE

BACKGROUND OF THE INVENTION

1. Field of the Invention

The present invention relates to the technical field of a disk device optimum for use in, e.g., an optical disk device wherein a disk-shaped recording medium, such as an optical disk, is loaded and unloaded with a disk tray.

2. Description of the Related Art

A disk device of the above type previously proposed in a prior application filed by the assignee of this application will be described below with reference to FIGS. 1 to 14. As shown in FIG. 1, an optical disk 1 as a disk-shaped recording medium is horizontally placed in a recess 3 formed on an upper surface of a tray body 2A of a disk tray 2. After that, when a tray front panel 2B of the disk tray 2 is lightly pushed in a direction of arrow a, a loading switch (not shown) is turned on. In response to the turning-on of the loading switch, as shown in FIG. 2, a loading mechanism (described later) is operated to withdraw the disk tray 2 horizontally through a tray entrance/exit opening 4 into a disk device body 6 of an optical disk device 5 in the direction of arrow a, i.e., in the loading direction, so that the optical disk 1 is automatically horizontally loaded on a disk table coupled to a spindle motor as described later.

After the loading, in response to, e.g., a recording and/or reproducing command signal from a host computer, the optical disk 1 is driven by the spindle motor to rotate at a high speed, and data is recorded on and/or reproduced from the optical disk 1 through an optical pickup. Upon receiving, e.g., an eject command signal from the host computer after the optical disk 1 has been subjected to recording and/or reproducing, the disk tray 2 is automatically unloaded through the tray entrance/exit opening 4 out of the disk device body 6 in a direction of arrow a', i.e., in the unloading direction, as shown in FIG. 1.

Next, as shown in FIGS. 3 to 9, the horizontal tray body 2A of the disk tray 2 and the vertical tray front panel 2B thereof lying perpendicularly to the directions of arrows a and a' are each formed of, e.g., a synthetic resin. An elongate bottom opening 8 is formed in the tray body 2A to extend from a central portion of the recess 3 to the side of a rear end portion (toward an end of the tray body 2A in the direction of arrow a) along a tray center line P1 parallel to the directions of arrows a and a', i.e., to the loading and unloading directions. Also, a pair of right and left horizontal guide rails 9 are integrally formed along both right and left side edges of the tray body 2A parallel to the tray center line P1. A rack 10 and a guide groove 11, which are substantially J-shaped and parallel to each other, are integrally formed in a bottom surface of the tray body 2A on one side thereof. The rack 10 and the guide groove 11 have linear portions 10a, 11a extending parallel to the tray center line P1, and arc-shaped portions 10b, 11b formed in an end portion of the tray body 2A on the same side as the front panel 2B.

A substantially box-shaped and shallow chassis 14 formed of, e.g., a synthetic resin, is provided inside the disk device body 6. The chassis 14 slides horizontally in the directions of arrows a and a' while the pair of right and left guide rails 9 on the disk tray 2 are guided by a plurality of guide ribs 15A, 15B, 15C integrally formed on inner surfaces of both right and left side plates 14a and a bottom portion 14b of the chassis 14. A vertically rotatable frame 16 formed of, e.g., a synthetic resin or metal plate, is attached onto the bottom portion 14b of the chassis 14. Insulator attachment portions 17, 18 are integrally formed in the vertically rotatable frame 16 at three positions; i.e., two in a rear end portion 16a on both right and left sides and one in a front end portion 16b at the center thereof. Three insulators 19, 20 serving as clampers, which are formed of elastic members of rubber, for example, are attached to the insulator attachment portions 17, 18.

The pair of right and left rubber-made insulators 19 attached to the rear end portion 16a of the vertically rotatable frame 16 are fastened onto the bottom portion 14b of the chassis 14 by set screws 21 which are inserted through the centers of the insulators 19, and one insulator 20 attached to the front end portion 16b of the vertically rotatable frame 16 is fastened onto a tip end of a vertically rotatable driving lever 23 by a set screw 22 which is inserted through the center of the insulator 20. The driving lever 23 is arranged perpendicularly to the tray center line P1 and is attached at its base end onto the bottom portion 14b of the chassis 14 by a pair of right and left horizontal pivot pins 24 to be rotatable in directions of arrows b and b', i.e., in the vertical direction. Accordingly, the driving lever 23 allows the vertically rotatable frame 16 to move up or down in directions of arrows c and c' upon its rotation in the vertical direction about the pair of right and left insulators 19 on the side of the rear end portion 16a which serve as fulcrums of the rotation. Additionally, a shallow recess 25 is formed in an upper surface of the vertically rotatable frame 16.

A loading mechanism 27 is attached to the bottom portion 14b of the chassis 14 on one side of the front end portion 16b of the vertically rotatable frame 16. The loading mechanism 27 comprises a loading motor 28, a pinion 29 driven by the loading motor 28 to rotate forward and backward, a pinion lever 31 causing a central shaft 29a of the pinion 29 to oscillate in a horizontal plane about a vertical pivot shaft 30 in directions of arrows d and d', a cam lever 34 driven by the pinion lever 31 through a pair of partial gears 32 to rotate in a horizontal plane about a vertical pivot shaft 33 in directions of arrows e and e', an arc-shaped cam groove 35 formed around the pivot shaft 33 of the cam lever 34 and having a level difference in the vertical direction, and a cam follower pin 36 integrally provided at a tip end of the driving lever 23 on one side thereof and loosely fitted in the cam groove 35. The pinion 29 is meshed with the rack 10 of the disk tray 2, and the central shaft 29a of the pinion 29 is loosely fitted in the guide groove 11.

The loading mechanism 27 operates such that the central shaft 29a of the pinion 29 is guided by the substantially J-shaped guide groove 11 of the disk tray 2, causing the pinion 29 to follow the substantially J-shaped rack 10 of the disk tray 2. More specifically, when loading the disk tray 2, the pinion 29 driven by the loading motor 28 to rotate forward is meshed with the linear portion 10a of the rack 10 from the side of the rear end portion of the disk tray 2 toward the side of the front end portion of the front panel 2B thereof in a linearly driving manner. The disk tray 2 is thereby withdrawn into the optical disk device 5 horizontally in the direction of arrow a. With continued forward rotation of the pinion 29 driven by the loading motor 28, the pinion 29 is oscillated in the direction of arrow d along the arc-shaped portion 10b of the rack 10. Corresponding to the oscillation of the pinion 29, the pinion lever 31 drives the cam lever 34 to rotate in the direction of arrow e through the pair of partial gears 32.

The cam follower pin 36 of the driving lever 23 is pushed upward by the cam groove 35 of the cam lever 34 in the direction of arrow b, whereupon the driving lever 23 drives the vertically rotatable frame 16 through the insulator 20 to rotate upward about the pair of right and left insulators 19 in the direction of arrow c from a descended position where the vertically rotatable frame 16 is inclined downwardly as shown in FIG. 7 to an ascended position where the vertically rotatable frame 16 is rotated up to a horizontal posture as shown in FIG. 8. When unloading the disk tray 2, the operation proceeds in a reversal manner to the loading operation. While the pinion 29 driven by the loading motor 28 to rotate backward is oscillated in the direction of arrow d' along the arc-shaped portion 10b of the rack 10, the cam lever 34 is rotated in the direction of arrow e', causing the cam follower pin 36 to move downward in the direction of arrow b' following the cam groove 35. At the same time, the driving lever 23 drives the vertically rotatable frame 16 through the insulator 20 to rotate downward about the pair of right and left insulators 19 in the direction of arrow c' from the ascended position shown in FIG. 8 to the descended position shown in FIG. 7. With continued backward rotation of the pinion 29 driven by the loading motor 28, the pinion 29 is meshed with the linear portion 10a of the rack 10 from the side of the front end portion of the disk tray 2 toward the side of the rear end portion thereof in linearly driving relation. The disk tray 2 is thereby pushed out of the optical disk device 5 in the direction of arrow a'.

A spindle motor 39 is vertically mounted within the recess 25 of the vertically rotatable frame 16 at a position near the front end portion 16b, and a disk table 40 formed of, e.g., a metal magnetic member, is horizontally fixed to an upper end of a motor shaft 39a of the spindle motor 39. The disk table 40 is integrally provided with a centering guide 40a which is formed on an upper surface of the disk table 40 at the center thereof and to which a central hole 1a of the optical disk 2 is fitted. Further, an optical pickup 41 is horizontally mounted within the recess 25 of the vertically rotatable frame 16 at a position rearward of the spindle motor 39. The optical pickup 41 has a carriage 44 to which an objective lens 42 and a light reflecting type skew sensor 43 are mounted to face upward vertically. An optical block 45 for transmitting a laser beam to the objective lens 42 is integrally attached to a side surface of the carriage 44.

A carriage moving mechanism 47 for linearly moving the carriage 44 in the directions of arrows a and a' along a pair of right and left guide shafts 46 is provided on the vertically rotatable frame 16. The carriage moving mechanism 47 comprises a pinion 50 driven by a carriage drive motor 48 through a gear train 49 to rotate forward and backward, and a rack 51 attached to one side surface of the carriage 44 and meshed with the pinion 50 in linearly driven relation. The spindle motor 39 and the objective lens 42 are arranged on the tray center line P1, and the objective lens 42 is movable in the directions of arrows a and a' along the tray center line P1.

A clamper support member 52 formed of, e.g., a metal plate, is horizontally bridged between upper ends of both the right and left side plates 14a of the chassis 14 to extend crossing above the disk tray 2. At a position right above the disk table 40, a disk clamper 53 in the form of a circular plate, which is formed of a synthetic resin and serves as a non-magnetic member, is held in a circular hole 54 formed at the center of the clamper support member 52 such that the disk clamper 53 is movable within a certain range in three-dimensional directions, i.e., vertically, transversely and longitudinally. A clamper receiver 52a for receiving from below a flange 53a, which is integrally formed along an outer periphery of the disk clamper 53 at its upper end, is integrally formed along an outer periphery of the circular hole 54 in the clamper support member 52. A disk-shaped magnet 55 is horizontally embedded in an upper central portion of the disk clamper 53. A later-described upper cover 62 formed of a metal plate and serving as a magnetic member is attached to the top of the chassis 14 to extend over the clamper support member 52.

Accordingly, as shown in FIG. 8, when the optical disk 1 is loaded with the disk tray 2 into the disk device body 6 horizontally in the direction of arrows a and the vertically rotatable frame 16 is then moved up in the direction of arrow c to the horizontal ascended position, the disk table 40 is inserted upward through the bottom opening 8 of the disk tray 2 and the centering guide 40a of the disk table 40 is fitted to the central hole 1a of the optical disk 1 from below. With the fitting of the disk table 40, the optical disk 1 is floated upward within the recess 3 of the disk tray 2, and simultaneously the disk clamper 53 is slightly floated upward from the flange receiver 52a of the clamper support member 52. At this time, the disk clamper 53 is attracted onto the disk table 40 by magnetic attracting forces of the magnet 55 in the disk table 40 which is now positioned close to a lower surface of the disk clamper 53, so that the optical disk 1 is chucked onto the disk table 40 horizontally with the aid of the disk clamper 53.

In response to, for example, a recording and/or reproducing command signal from a host computer, the optical disk 1 is driven by the spindle motor 39 to rotate at a high speed, and the carriage 44 of the optical pickup 41 is moved by the carriage moving mechanism 47 in the directions of arrows a and a', causing the objective lens 42 to move in the directions of arrows a and a' along the tray center line P1. Then, a laser beam transmitted from the optical block 45 is irradiated to a lower surface of the optical disk 1 through the objective lens 42, and light reflected from the optical disk 1 is received by the optical block 45 through the objective lens 42. As a result, data is recorded on and/or reproduced from the optical disk 1.

In this connection, the carriage moving mechanism 47 operates such that the pinion 50 driven by the carriage drive motor 48 through the gear train 49 to rotate forward and backward is meshed with the rack 51 in linearly driving relation, and the carriage 44 is moved in the directions of arrows a and a' along the pair of right and left guide shafts 46. Upon receiving, e.g., an eject command signal from the host computer after data has been recorded on and/or reproduced from the optical disk 1, the vertically rotatable frame 16 is moved down to the descended position in the direction of arrow c and the disk table 40 is dechucked from the disk clamper 53 to move away from the optical disk 1 downward. Following that, the optical disk 1 is horizontally placed in the recess 3 of the disk tray 2 and then unloaded out of the disk device body 6 horizontally in the direction of arrow a', as shown in FIG. 7.

In the unloading condition of the optical disk device 5, as shown in FIG. 7, the disk clamper 53 is lowered by its own weight and is suspended while the flange 53a along the outer periphery of the disk clamper 53 is held in abutment with the flange receiver 52a of the clamper support member 52. In this suspended state, a clearance L2 is secured between the lower surface of the disk clamper 53 and the optical disk 1 on the disk tray 2 so that the optical disk 1 does not interfere with the disk clamper 53 when the optical disk 1 is loaded and unloaded. In the unloading process of the optical disk device 5, therefore, the disk clamper 53 is lowered from the clamper support member 52 by a clearance L2, and the clearance L1 must be secured between the disk clamper 53 and the optical disk 1. Thus, a relatively large space corresponding to L1+L2 is present between the lower surface of the clamper support member 52 and the upper surface of the optical disk 1.

As shown in FIGS. 6 and 9 to 12, a disk tray guide mechanism for horizontally sliding the disk tray 2 in the directions of arrows a and a' with respect to the disk device body 6 comprises a pair of right and left slide guide grooves 12 formed in bottom surfaces of the pair of right and left guide rails 9, which are provided on the tray body 2A of the disk tray 2, and extended parallel to the tray center line P1, a plurality of main and sub-guide ribs 15A, 15B which are integrally formed on the bottom portion 14b of the chassis 14 to lie in two lines parallel to the tray center line P1 at positions near both right and left side ends thereof and are engaged with the pair of right and left slide guide grooves 12, and a plurality of floating-preventive guide ribs 15C integrally formed on the inner surfaces of both the right and left side plates 14a of the chassis 14 in match with top positions of the pair of right and left guide rails 9.

More specifically, two main guide ribs 15A for not only avoiding wobbling movement of the disk tray 2 in a transverse direction (direction of arrow g) perpendicular to the longitudinal direction of the disk tray 2, i.e., to the directions of arrows a and a', but also restricting the height of the disk tray 2 are arranged on one of the right and left sides of the chassis 14 at a position near the tray entrance/exit opening 4, which is formed in the front panel 60 of the disk device body 6, to lie in one line with a small spacing L11 therebetween in the longitudinal direction (the directions of arrows a and a'). Also, two sub-guide ribs 15B for restricting the height of the disk tray 2 are arranged on one of the right and left sides of the chassis 14 to lie in one line between a position behind the two main guide ribs 15A and a rear panel 61 of the disk device body 6. Further, four sub-guide ribs 15B are arranged on the other of the right and left sides of the chassis 14 to lie in one line between the front panel 60 and the rear panel 61 of the disk device body 6. Both the slide guide grooves 12 have widths W1 equal to each other, and a width W2 of each of the two main guide ribs 15A in the direction of arrow g is substantially equal to (exactly, a little smaller than) the width W1 of both the slide guide grooves 12. A width W3 of each of the sub-guide ribs 15B in the direction of arrow g is fairly smaller than the width W1 of both the slide guide grooves 12.

With the disk tray guide mechanism thus constructed, even if tolerances of the disk tray 2 and the chassis 14 are set to be relatively large when molded of a synthetic resin, the disk tray 2 can be smoothly loaded and unloaded in the directions of arrows a and a' between the unloaded position shown in FIG. 10 and the loaded position shown in FIG. 11 because the two main guide ribs 15A serve to rather avoid the disk tray 2 from wobbling in the width direction of the disk tray 2 (the direction of arrow g) and the main and sub-guide ribs 15A, 15B serve to restrict the height of the disk tray 2. When the disk device body 6 is used in a normal horizontal posture, the disk tray 2 is stably horizontally rested on the main and sub-guide ribs 15A, 15B by its own weight, and therefore the plurality of floating-preventive guide ribs 15C develop no function. On the other hand, when the disk device body 6 is used in a vertical posture, or when the optical disk device 5 is inverted upside down, the plurality of floating-preventive guide ribs 15C function as ribs for preventing tilting and falling of the disk tray 2.

FIGS. 13 and 14 show a computer body 111 of a computer apparatus 110. Inside a front panel 11a of the computer body 111, a plurality of recording/reproducing devices, such as the above-mentioned optical disk device 5, a floppy disk device 112 and a hard disk device 113, are incorporated in vertical multiple stages. Further, a ventilation fan 114 is incorporated in a rear panel 111b (or side panel) of the computer body 111 to discharge air in the computer body 111 to the outside in the direction of arrow h. The interior of the computer body 111 is thereby forcibly cooled to avoid a rise of temperature in the computer body 111.

FIG. 14 shows a casing of the disk device body 6 of the optical disk device 5 incorporated inside the front panel 111a of the computer body 111. The casing of the disk device body 6 is in the form of a flat box built up of the front panel 60 which is formed of a synthetic resin and has the tray entrance/exit opening 4 formed therein, the rear panel 61 integrally formed at a rear end of the chassis 14, and upper and lower covers 62, 63 formed of metal plates and fixedly fitted respectively to the top and bottom of the chassis 14 with screws. In addition, printed boards 64, 65 are fixed to the bottom of the chassis 14 with screws from below to extend horizontally. A gap 67 is left between the printed boards 64, 65 and the lower cover 63 to avoid contact between the lower cover 63 and a plurality of electronic circuit elements 66 mounted to lower surfaces of the printed boards 64, 65.

As shown in FIG. 2, an eject button 68, an emergency hole 69, an earphone jack insertion hole 70, a volume control 71, etc. are disposed on the front panel 60 below the tray entrance/exit opening 4 to lie in a horizontal line. Of course, as shown in FIGS. 13 and 14, the eject button 68, the emergency hole 69, the earphone jack insertion hole 70, the volume control 71, etc. are exposed to a front surface of the front panel 111a of the computer body 111. When a computer user pushes the eject button 68 by a finger, the disk tray 2 can be unloaded at any time. In case of emergency such as a power failure, when a computer user pushes a thin rod-like member into the emergency hole 69, the cam lever 34 shown in FIG. 3 is rotated in the direction of arrow e, allowing the disk tray 2 to be manually unloaded. Also, when a computer user desires to listen sounds from a CD, an earphone jack is inserted into the earphone jack insertion hole 70 and the volume of sounds is adjusted by the volume control 71.

As shown in FIGS. 13 and 14, therefore, when the ventilation fan 114 in the computer apparatus 110 is operated to discharge air in the computer body 111 to the outside, a negative pressure is developed in the disk device body 6 of the optical disk device 5, whereby open air is sucked into the disk device body 6, through a gap between an inner periphery of the tray entrance/exit opening 4 and the tray front panel 2B, as well as gaps left in an attachment hole of the eject button 68, the emergency hole 69, the earphone jack insertion hole 70, an attachment hole of the volume control 71, etc.

The optical disk device 5 previously proposed is however still problematic in the following point. As mentioned above, when the ventilation fan 114 in the computer apparatus 110 is operated to discharge air in the computer body 111 to the outside, a negative pressure is developed in the disk device body 6 of the optical disk device 5, whereby open air is sucked into the disk device body 6 through gaps left in the tray entrance/exit opening 4, in the attachment hole of the eject button 68, the emergency hole 69, the earphone jack insertion hole 70, the attachment hole of the volume control 71, etc., as indicated by arrows in FIG. 14. Accordingly, dirt and dust in open air are also sucked into the disk device body 6 together with the open air. If dirt and dust sucked into the disk device body 6 adhere to the recording and/or reproducing surface of the optical disk 1, or adhere and deposit onto the disk table 40 and the objective lens 42 of the optical pickup 41, the presence of dirt and dust may impede irradiation of the laser beam to the optical disk 1 and reception of the reflected laser beam from the optical disk 1, or may incline the optical disk 1 in a state chucked on the disk table 40, thus causing, e.g., a failure in focusing of the laser beam. As a result, there may occur an error in recording and/or reproducing (a failure in writing and/or reading) of data on and from the optical disk 1. Also, if dirt and dust sucked into the disk device body 6 adhere and deposit onto, e.g., the guide shafts 46 and the gear train 49 of the carriage moving mechanism 47, the movement of the carriage 44 is adversely affected and such a problem as causing a trouble in seek and tracking is more likely to occur.

SUMMARY OF THE INVENTION

With a view of solving the problems set forth above, an object of the present invention is to provide a disk device which can avoid as far as possible dirt and dust from being sucked into a disk device body together with open air.

Another object of the present invention is to provide a disk device which can realize a further reduction in thickness of the disk device in its entirety while enabling a disk-shaped recording medium to be smoothly chucked and dechucked to and from a disk table.

To achieve the above objects, in a disk device according to the present invention, an intake port is formed in a front panel of a disk device body outside a tray entrance/exit opening, an intake passage is formed inside a cover of the disk device body and communicated at a front end thereof with the intake port, and a discharge port is formed in the intake passage and opened to the outside of the cover.

With the disk device of the present invention thus constructed, when the disk device is incorporated in a computer body of a computer apparatus for practical use and a ventilation fan is operated to discharge air in the computer body to the outside, open air can be positively sucked into the computer body from the intake port in the front panel, followed by passing through the intake passage and the discharge port. Accordingly, the air pressure in the intake port, the intake passage and the discharge port becomes higher than the air pressure in a disk loading space within the disk device body. Open air can be hence inhibited from being sucked into the disk loading space within the disk device body through a narrow gap between an inner periphery of the tray entrance/exit opening of the disk device body and a tray front panel, as well as narrow gaps left in an attachment hole of an eject button, an emergency hole, an earphone jack insertion hole, an attachment hole of a volume control, etc.

Also, in the disk device of the present invention, a magnet magnetized in the vertical direction is embedded in an upper central portion of a disk clamper, and an upper magnetic member is disposed in a position above the disk clamper for attracting the disk clamper to a position above a chucked position of a disk-shaped recording medium under vertical magnetically attracting forces produced by the magnet and acting on the upper magnetic member when a disk tray is in an unloaded condition. Then, when the disk-shaped recording medium is chucked, a disk table formed of a magnetic member is moved to come so close to the magnet that the disk clamper is attracted onto the disk table under the vertical magnetically attracting forces produced by the magnet and now acting on the disk table.

With the disk device of the present invention thus constructed, in the unloaded condition, the disk clamper can be attracted to the position above the chucked position of the disk-shaped recording medium. A clearance to be secured in the unloading condition between the disk clamper/the clamper support member and the disk-shaped recording medium on the disk tray can be therefore much smaller than the clearance L1+L2 in the previously proposed disk device shown in FIG. 7. In addition, since the magnet embedded in the disk clamper is magnetized in the vertical direction, operations of descending and ascending the disk clamper under the vertical magnetically attracting forces produced by the magnet can be surely reversely switched from one to the other by moving the disk table, which is formed of a magnetic member, to come closer to the disk clamper from below and to move away from it downward. As a result, the disk-shaped recording medium can be smoothly chucked and dechucked to and from the disk table.

BRIEF DESCRIPTION OF THE DRAWINGS

FIG. 18A is a rear view of a tray front panel of a disk tray in FIG. 15, and FIG. 18B is a sectional view taken along line XVIII—XVIII in FIG. 18A.

DESCRIPTION OF THE PREFERRED EMBODIMENT

Figure 1:
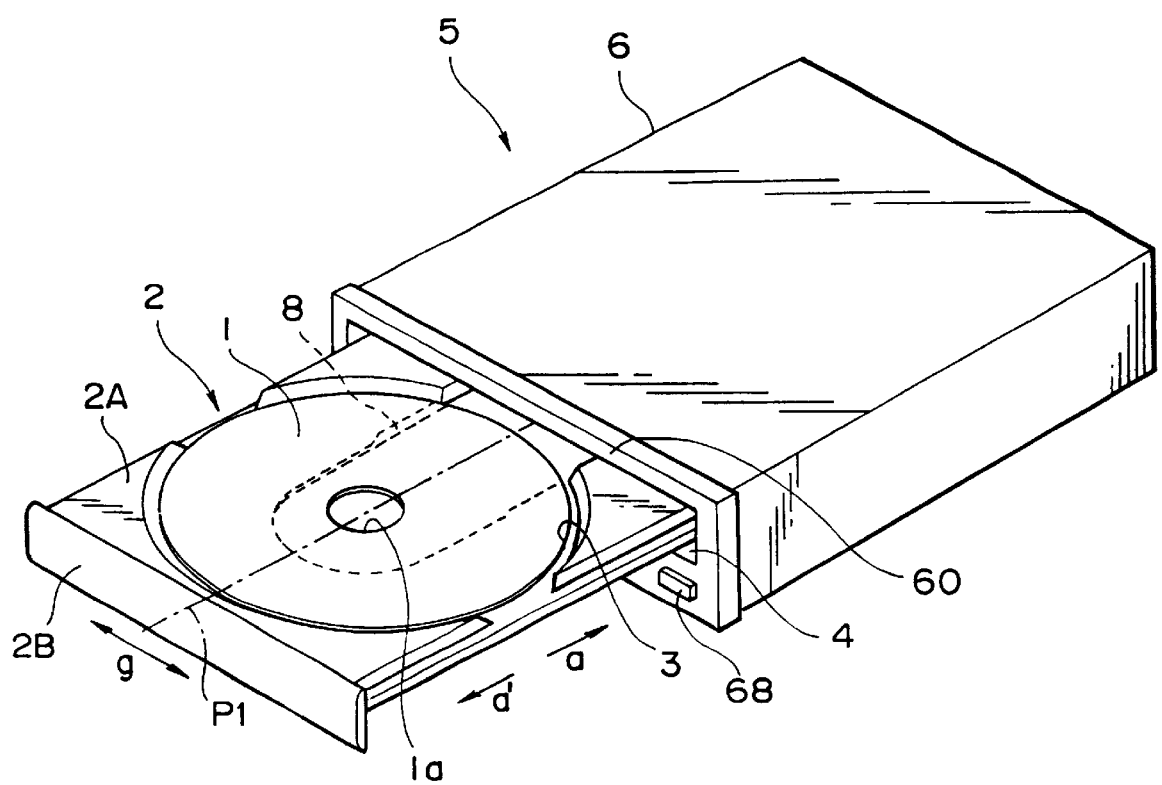
FIG. 1 is a perspective view of the whole of a previously proposed optical disk device in an unloaded condition.

An embodiment of an optical disk device to which the present invention is applied will be described hereunder with reference to FIGS. 15 to 17. Note that the same structural components as those in FIGS. 1 to 10 are denoted by the same reference numerals and description of those components are not repeated.

[Description of Dust-Proof Structure of Optical Disk Device]

First, a dust-proof structure of an optical disk device 5 will be explained with reference to FIGS. 15 to 21.

As shown in FIGS. 15 to 20, a plurality of intake ports 74 each being elongate are formed in a front panel 60 of a disk device body 6 to lie in a transverse (horizontal) line outside a tray entrance/exit opening 4 along a lower edge of the opening 4. A gap between a lower cover 63 of the disk device body 6 and printed boards 64, 65 is formed as an intake passage 75. A front end (on the side of the front panel 60) of the intake passage 75 is communicated with the plurality of intake ports 74. A plurality of first discharge ports 76 are formed in a front end portion of the intake passage 75 at a position near the front panel 60 and are opened to the outside of the lower cover 63 (downward). A large-area second discharge port 77 is formed in a rear end portion (on the side of a rear panel 61) of the intake passage 75 and is opened to the outside of the lower cover 63 (rearward).

Figure 3:
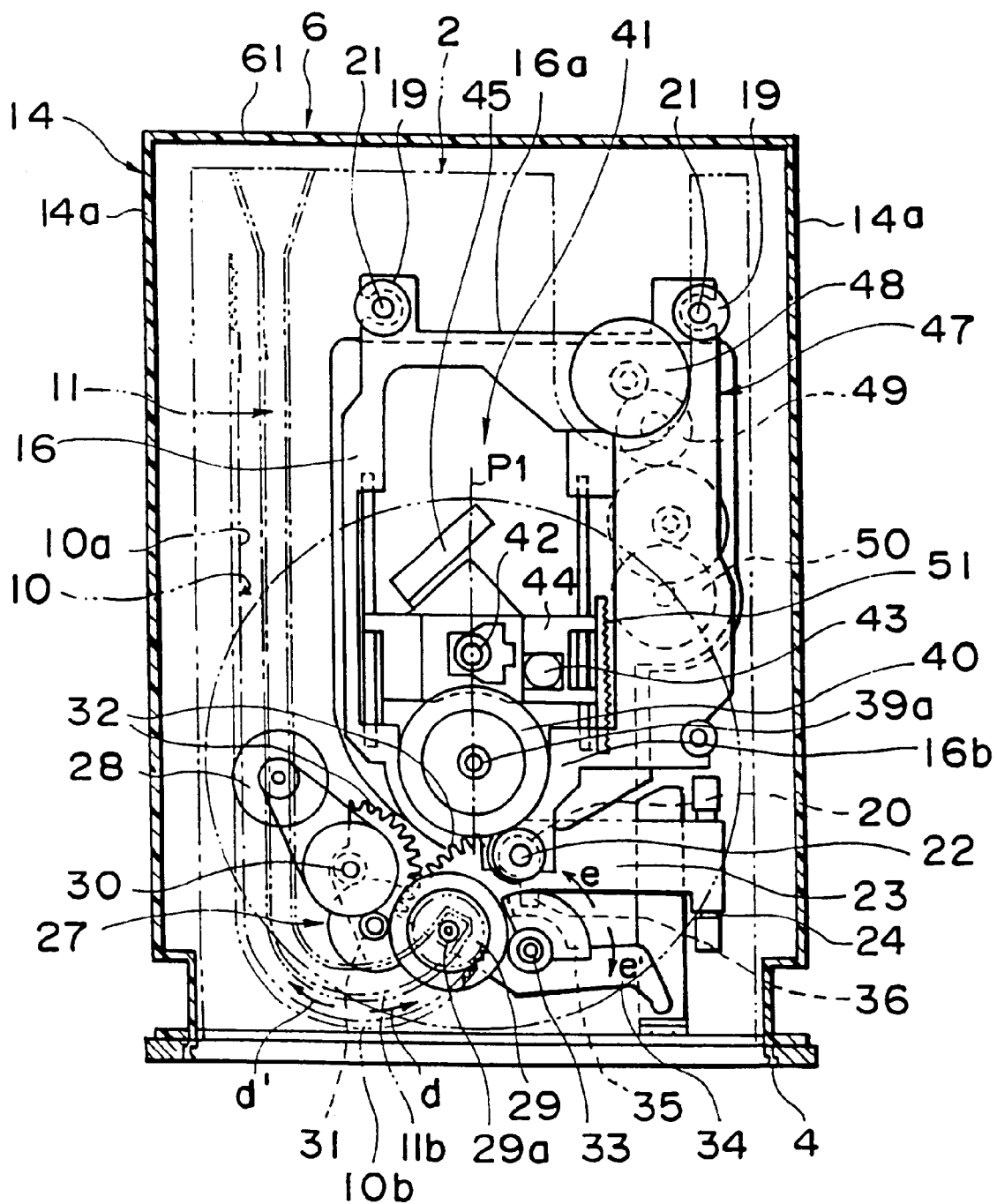
FIG. 3 is a plan view, partly sectioned, for explaining a loading mechanism in the previously proposed optical disk device.
Figure 4:
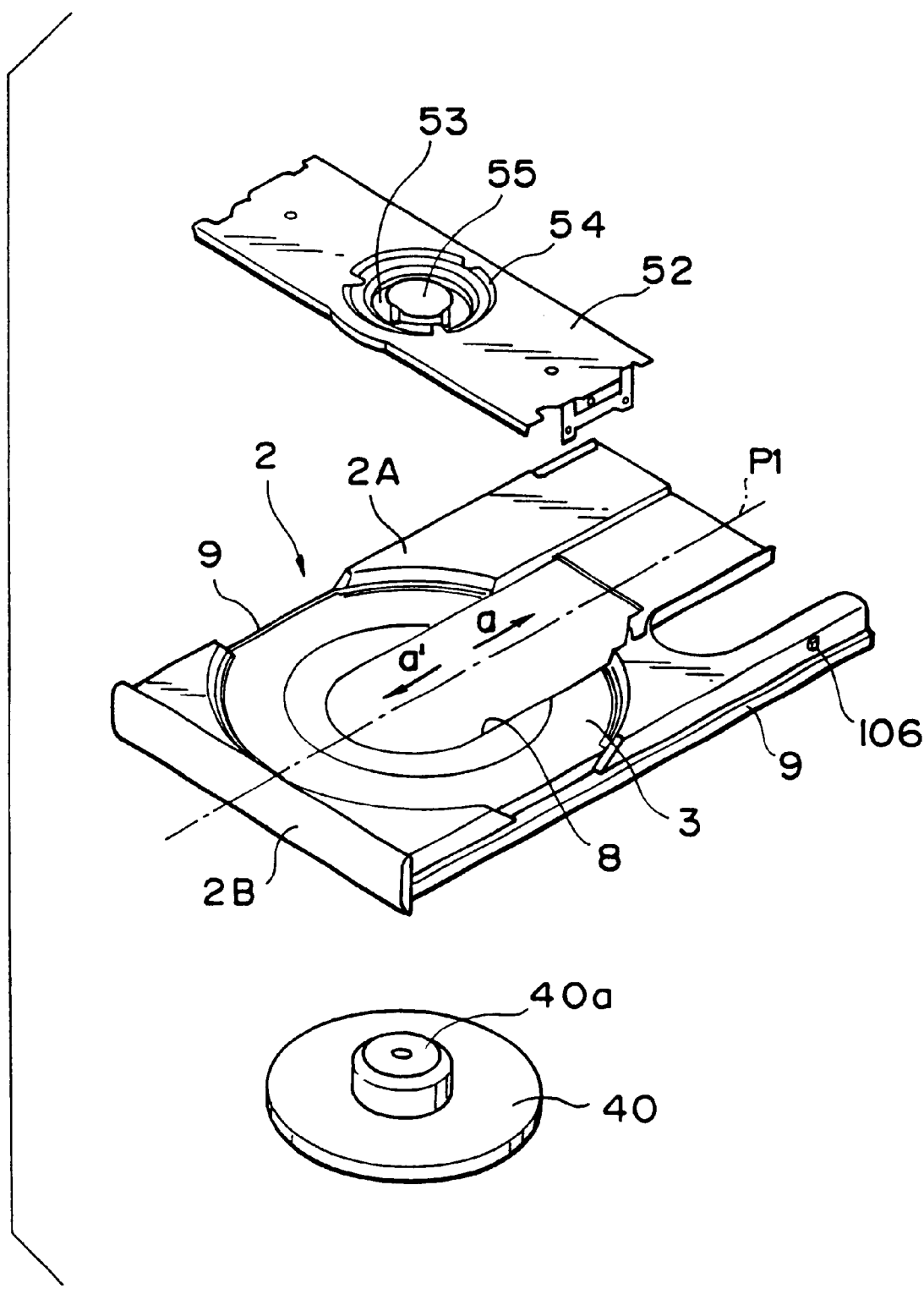
FIG. 4 is an exploded perspective view of a disk table, a disk tray and a disk clamper of the previously proposed optical disk device.
Figure 5:
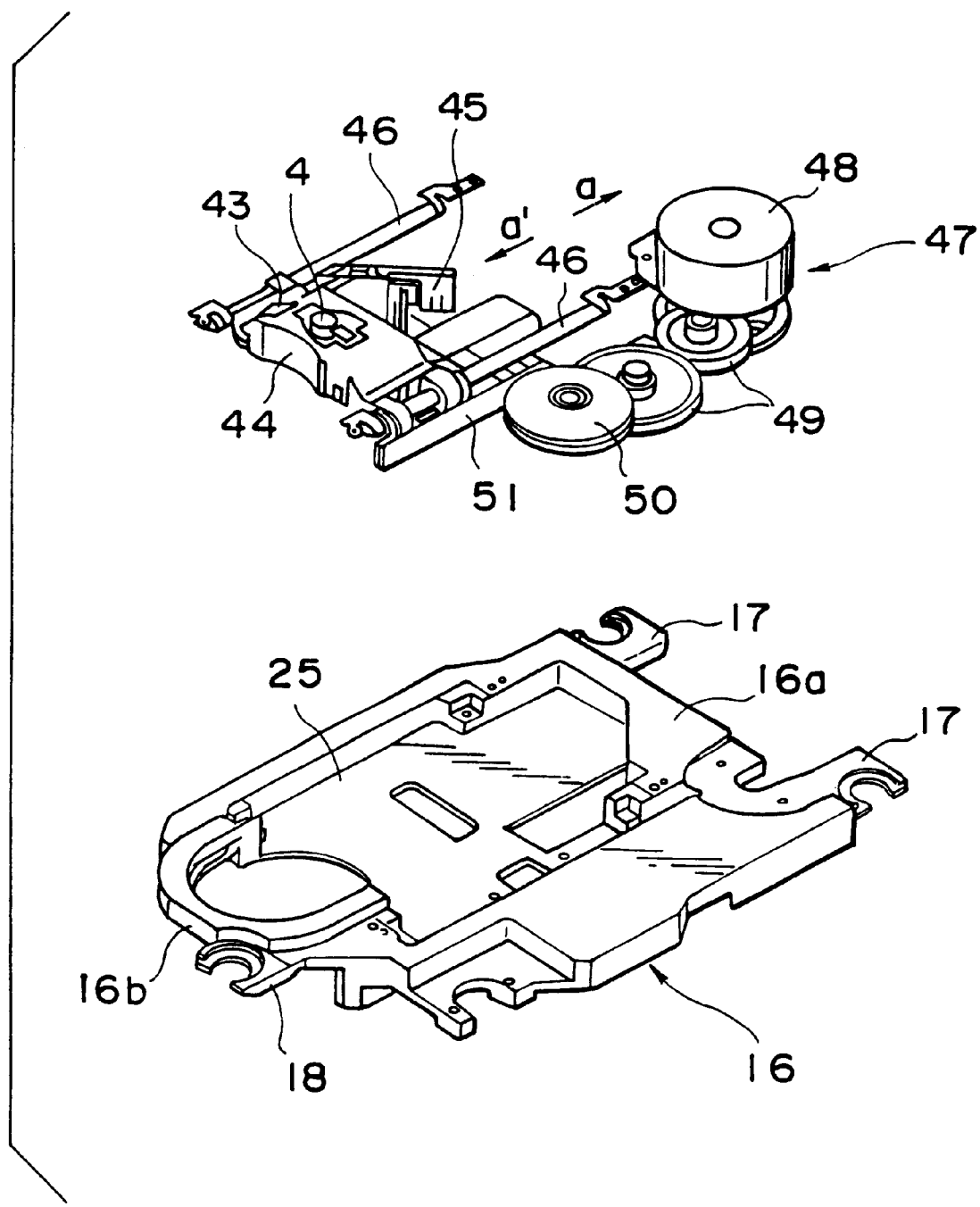
FIG. 5 is an exploded perspective view for explaining a head moving mechanism and a vertically rotatable frame in the previously proposed optical disk device.
Figure 6:
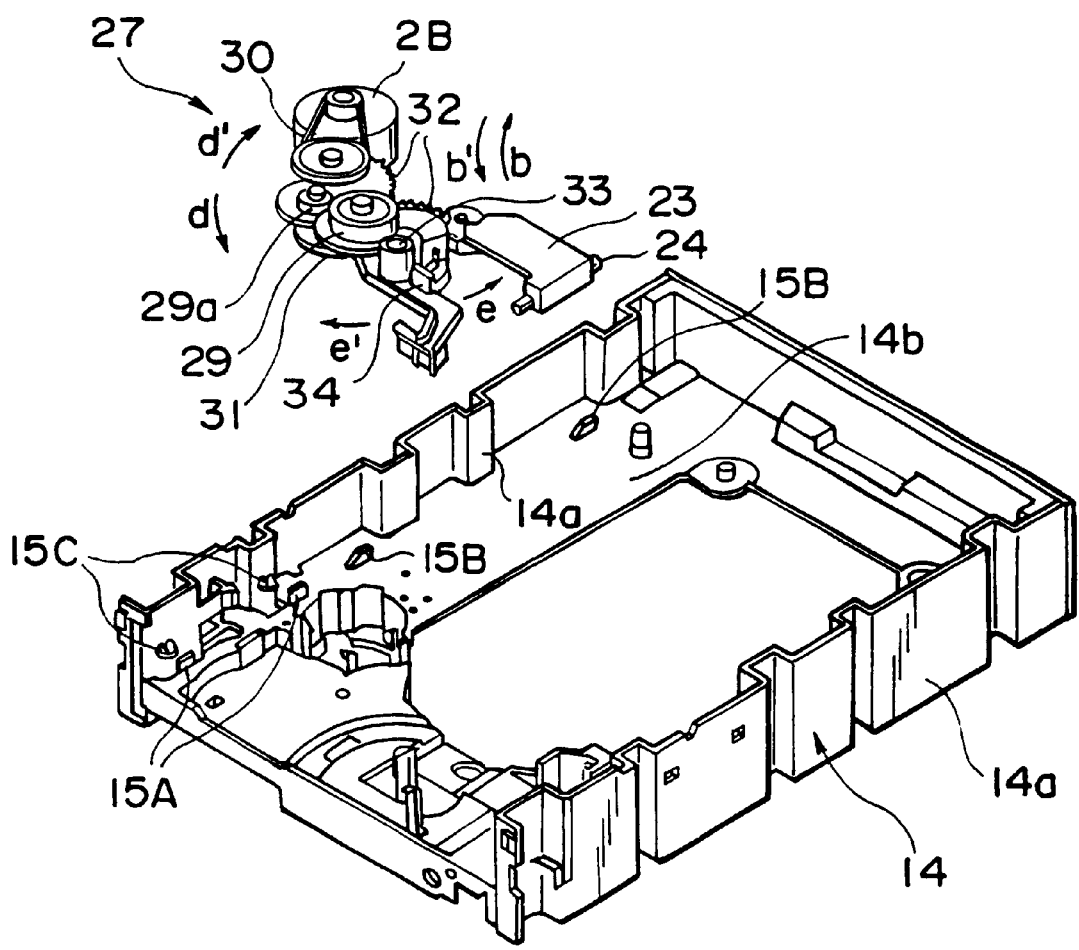
FIG. 6 is an exploded perspective view for explaining a loading mechanism and a chassis in the previously proposed optical disk device.
Figure 20:
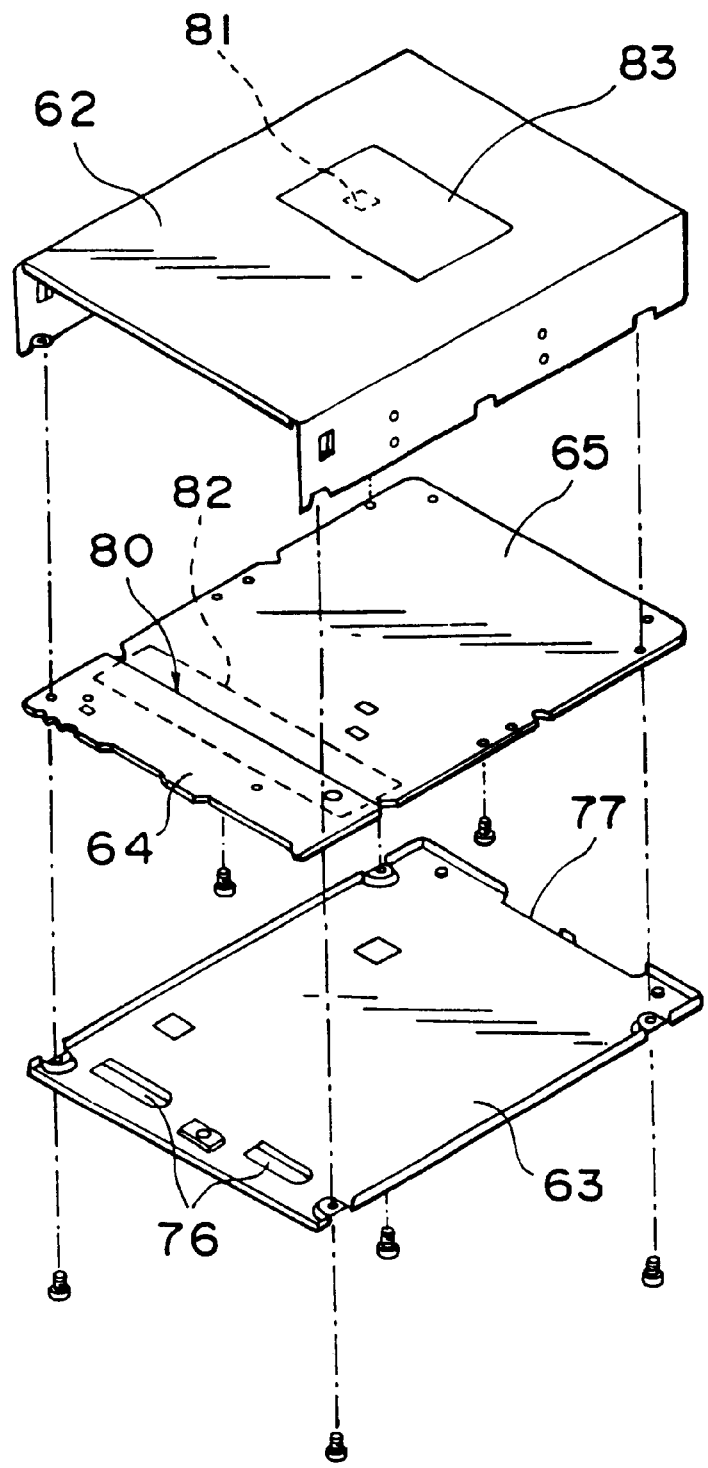
FIG. 20 is an exploded perspective view of upper and lower covers and a printed board in FIG. 15.

A dust collecting filter 78 is detachably provided inside the intake port 74 of the front panel 60 and midway the intake passage 75. Further, when the optical disk device 5 is transported from the factory, a seal 79 is disposed inside an emergency hole 69 to seal off the communication of the hole 69 with the interior of the optical disk device 5, as shown in FIG. 16. When ejecting an optical disk in case of emergency, a computer user can easily break through the seal 79 by pushing a thin rod-like member into the emergency hole 69, and then manually unload a disk tray 2 by rotating the cam lever 34, shown in FIG. 3, is in the direction of arrow e. It is also preferable that, as shown in FIGS. 15 and 20, a joint 80 between the printed boards 64 and 65 and a cutout or hole 81 in the upper cover 62 be closed by seals 82, 83.

Figure 13:
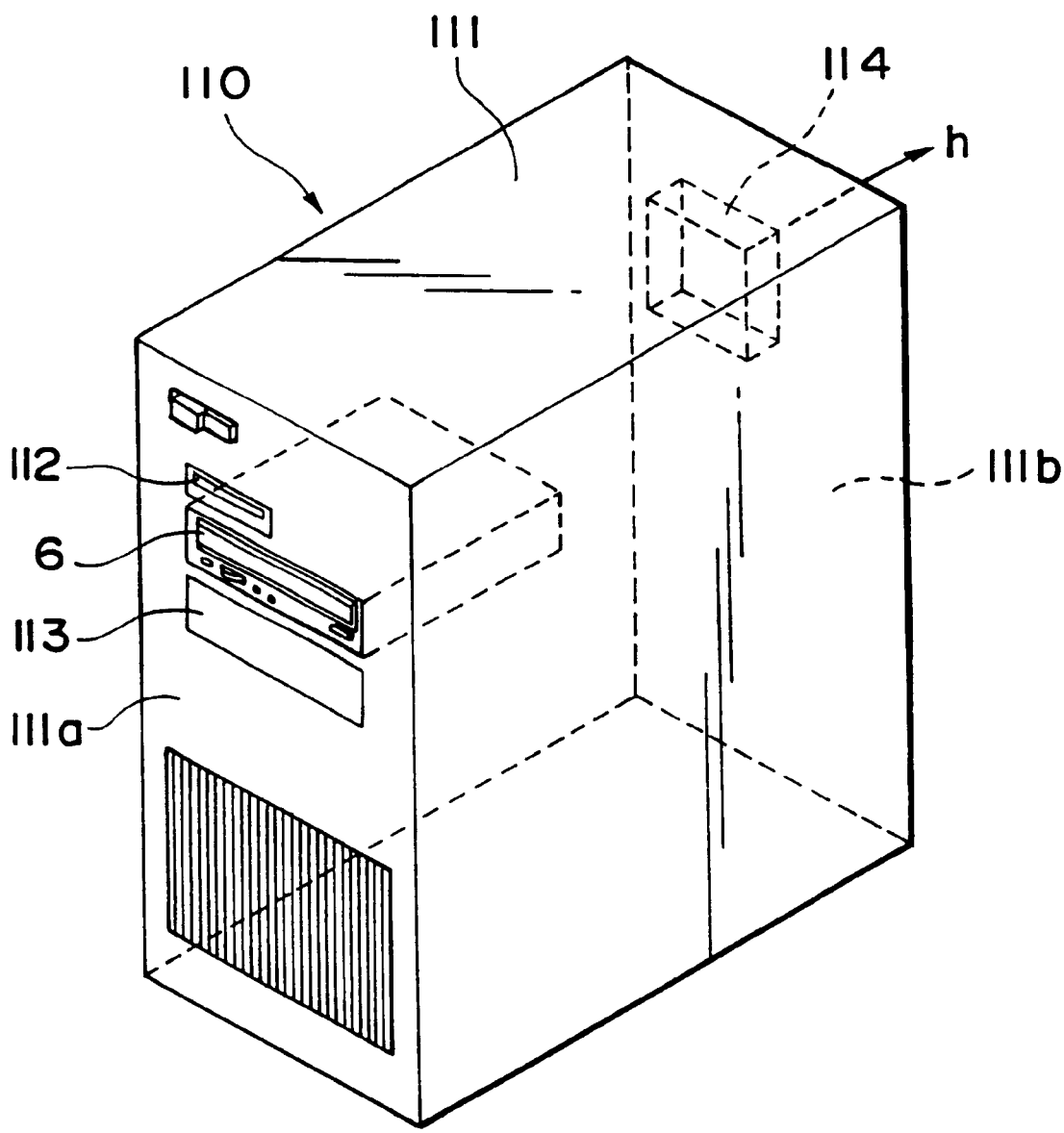
FIG. 13 is a perspective view of a computer apparatus in which previously proposed optical disk device is incorporated.
Figure 14:
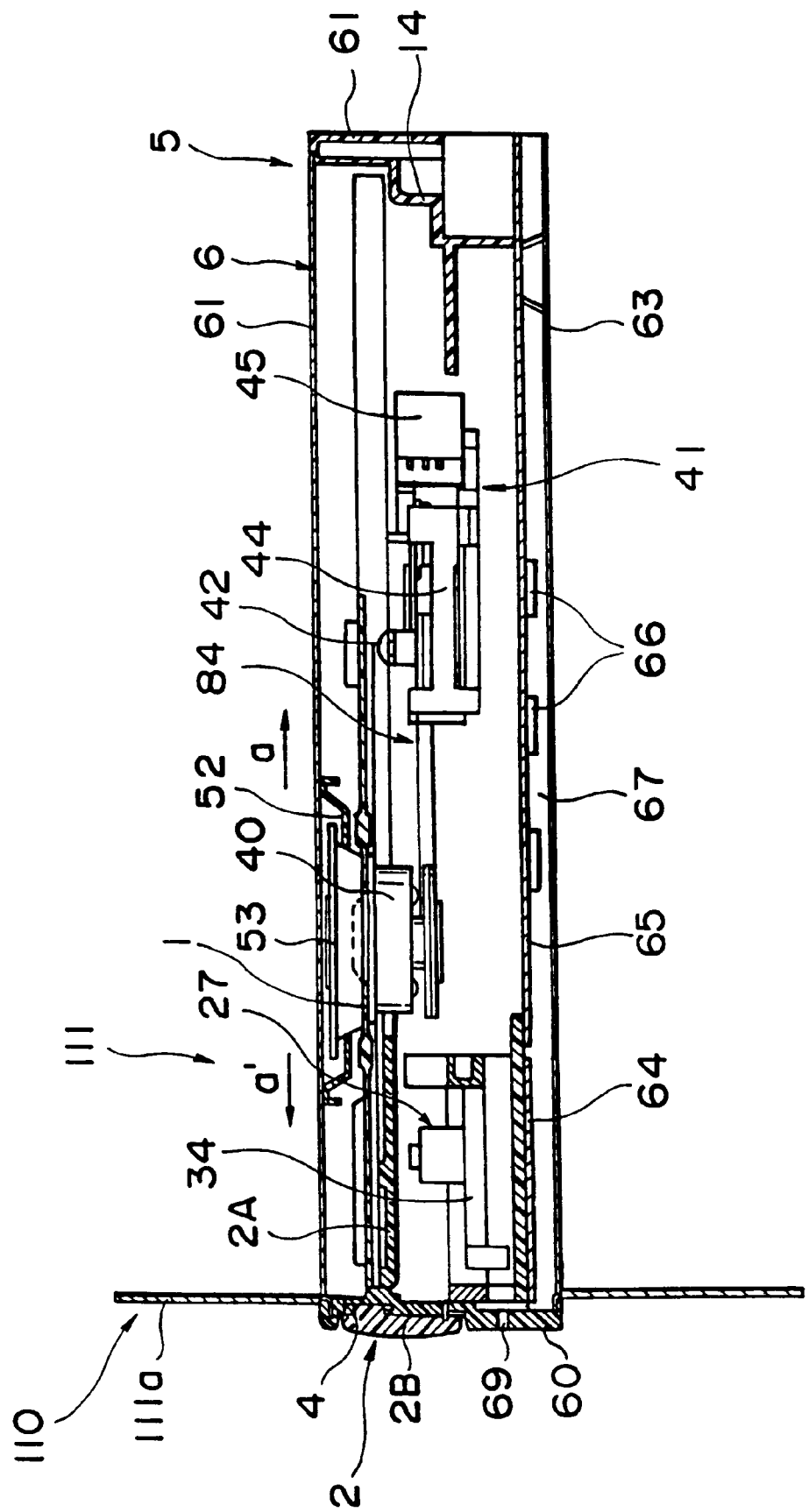
FIG. 14 is a side sectional view for explaining a casing of the previously proposed optical disk device.

Accordingly, when the optical disk device 5 is incorporated inside the front panel 111a of the computer body 111 of the computer apparatus 110 as shown in FIG. 13, the plurality of intake ports 74 are opened to the outside of the front panel 111a, whereas the first and second discharge ports 76, 77 are opened to the interior of the computer body 111.

Figure 15:
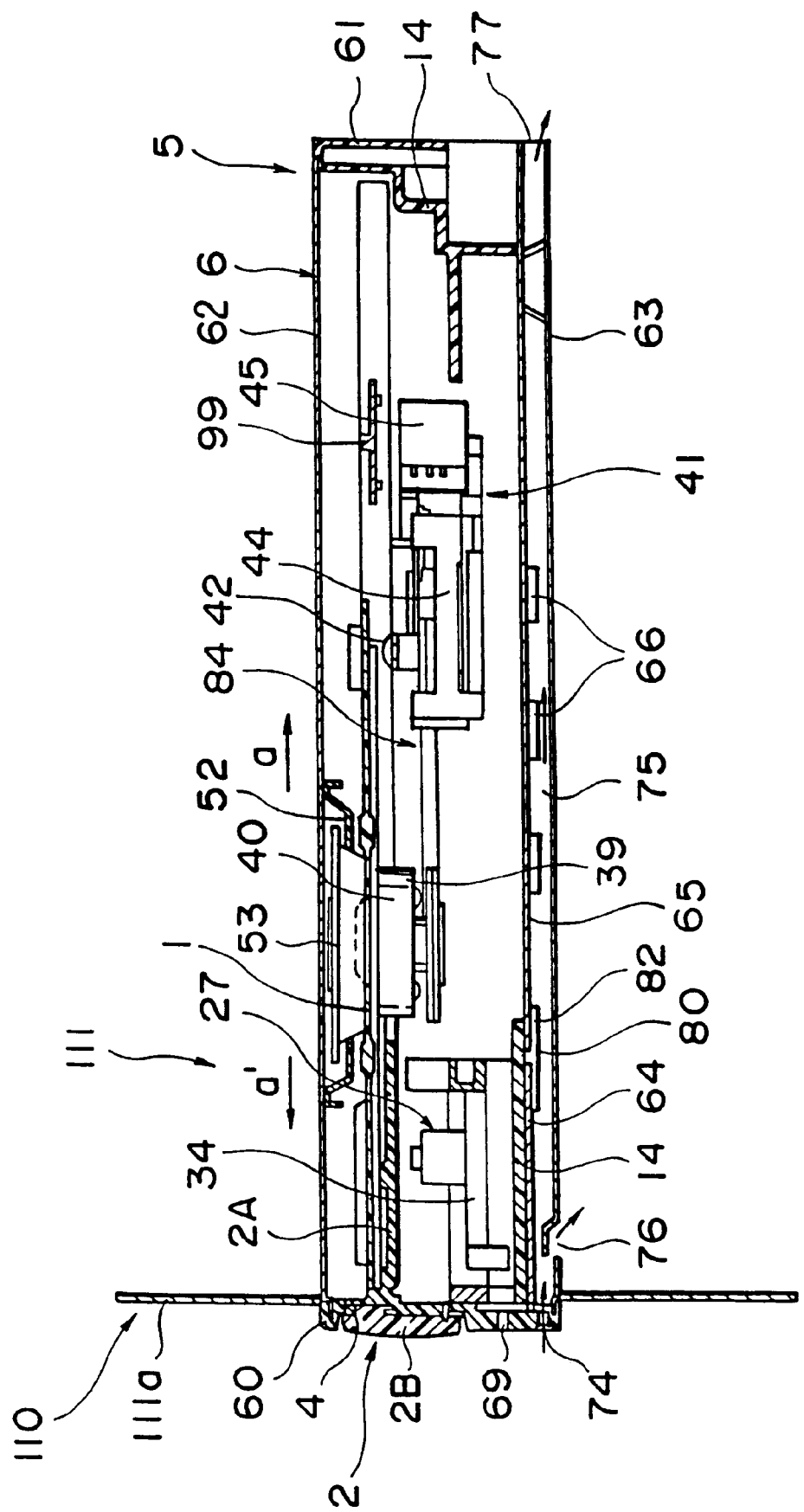
FIG. 15 is a side sectional view for explaining a dust-proof structure of an optical disk device to which the present invention is applied.

During the recording and/or reproducing of an optical disk 1 by the optical disk device 5 (as shown in FIG. 15, the tray entrance/exit opening 4 is closed by a tray front panel 2B of the disk tray 2 loaded in the disk device body 6 during the recording and/or reproducing operation), when the ventilation fan 114 in the computer body 110, shown in FIG. 13, is operated to discharge air in the computer body 111 to the outside, open air is positively sucked under a negative pressure developed in the computer body 111 from the plurality of intake ports 74 into the computer body 111 through the intake passage 75 and the first and second discharge ports 76, 77 as indicated by arrows in FIG. 15.

Figure 2:
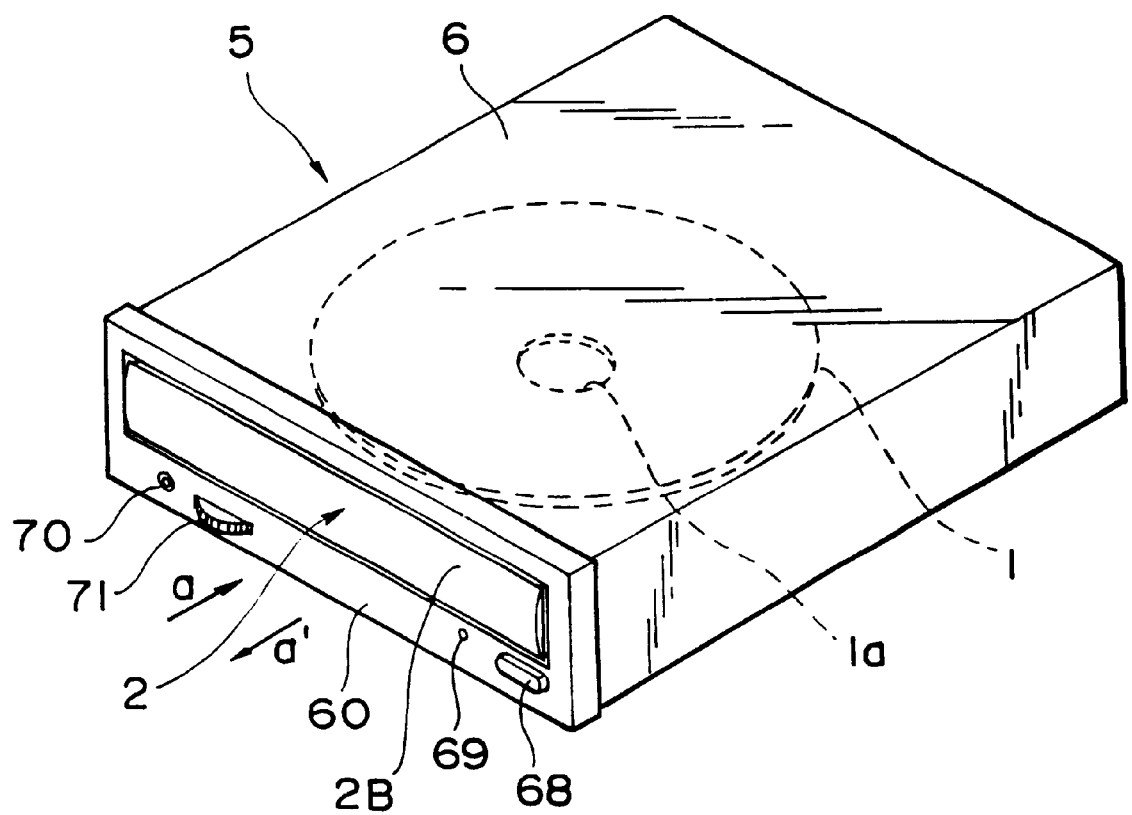
FIG. 2 is a perspective view of the whole of the previously proposed optical disk device in a loaded condition.

In other words, the plurality of intake ports 74 have an opening area set to be much larger than a total opening area of a narrow gap between an inner periphery of the tray entrance/exit opening 4 and the tray front panel 2B, as well as narrow gaps left in an attachment hole of the eject button 68, the earphone jack insertion hole 70, an attachment hole of the volume control 71, etc. shown in FIG. 2. In addition, the emergency hole 69 is sealed off inside the hole. This arrangement allows open air to be positively sucked from the plurality of intake ports 74 into the computer body 111 through the intake passage 75 and the first and second discharge ports 76, 77 as indicated by arrows in FIG. 15.

Accordingly, the air pressure in the intake passage 75 becomes higher than the air pressure in a disk loading space 84 defined in the disk device body 6 between the upper cover 62 and the printed boards 64, 65. Open air can be hence greatly inhibited from being sucked into the disk loading space 84 within the disk device body 6 through the narrow gap between the inner periphery of the tray entrance/exit opening 4 and the tray front panel 2B, as well as the narrow gaps left in the attachment hole of the eject button 68, the earphone jack insertion hole 70, the attachment hole of the volume control 71, etc.

As a result, dirt and dust in open air can be avoided as far as possible from being sucked into the disk loading space 84 within the disk device body 6 together with the open air. It is therefore possible to avoid such troubles that the sucked dirt and dust adhere to the recording and/or reproducing surface of the optical disk 1, or adhere and deposit onto the disk table 40 and the objective lens 42 of the optical pickup 41, thereby impeding irradiation of a laser beam to the optical disk 1 and reception of the reflected laser beam from the optical disk 1, or inclining the optical disk 1 in a state chucked on the disk table 40, whereby a failure in focusing of the laser beam occurs to cause an error in recording and/or reproducing (a failure in writing and/or reading) of data on and from the optical disk 1. It is also possible to avoid such a trouble that the dirt and dust sucked into the disk loading space 84 adhere and deposit onto, e.g., the guide shafts 46 and the gear train 49 of the carriage moving mechanism 47, thereby adversely affecting the movement of the carriage 44 and causing a problem in seek and tracking. Consequently, the optical disk device 5 with high performance and high quality can be realized.

In addition, by setting the opening area of the first discharge port 76 in the intake passage 75 as large as possible and positioning the first discharge port 76 as close as possible to the intake ports 74, the dirt and dust sucked into the intake passage 75 through the intake ports 74 can be quickly discharged to the outside of the disk device body 6 and hence avoided from further going into the intake passage 75 and then entering the disk loading space 84 from midway the intake passage 75. Also, with the emergency hole 69 closed by the seal 79, dirt and dust can be avoided from being sucked into the disk loading space 84 through the emergency hole 69. Further, with the joint 80 between the printed boards 64 and 65 and a cutout or hole 81 in the upper cover 62 closed by the seals 82, 83, the air pressure in the intake passage 75 can be held even higher than the air pressure in the disk loading space 84. As a result, the dust-proof effect of the optical disk device 5 can be further improved.

Moreover, as shown in FIG. 15, a plurality of electronic circuit elements 66 are mounted to lower surfaces of the printed boards 64, 65, and a gap between the lower surfaces of the printed boards 64, 65 and the lower cover 63 is utilized as part of the intake passage 75. This arrangement provides another advantage that since the plurality of electronic circuit elements 66 are air-cooled by open air vigorously flowing through the intake passage 75, the electronic circuit elements 66 such as IC's are prevented from malfunctioning due to an excessive temperature rise.

[Description of Modification of Intake Passage]

Figure 21:
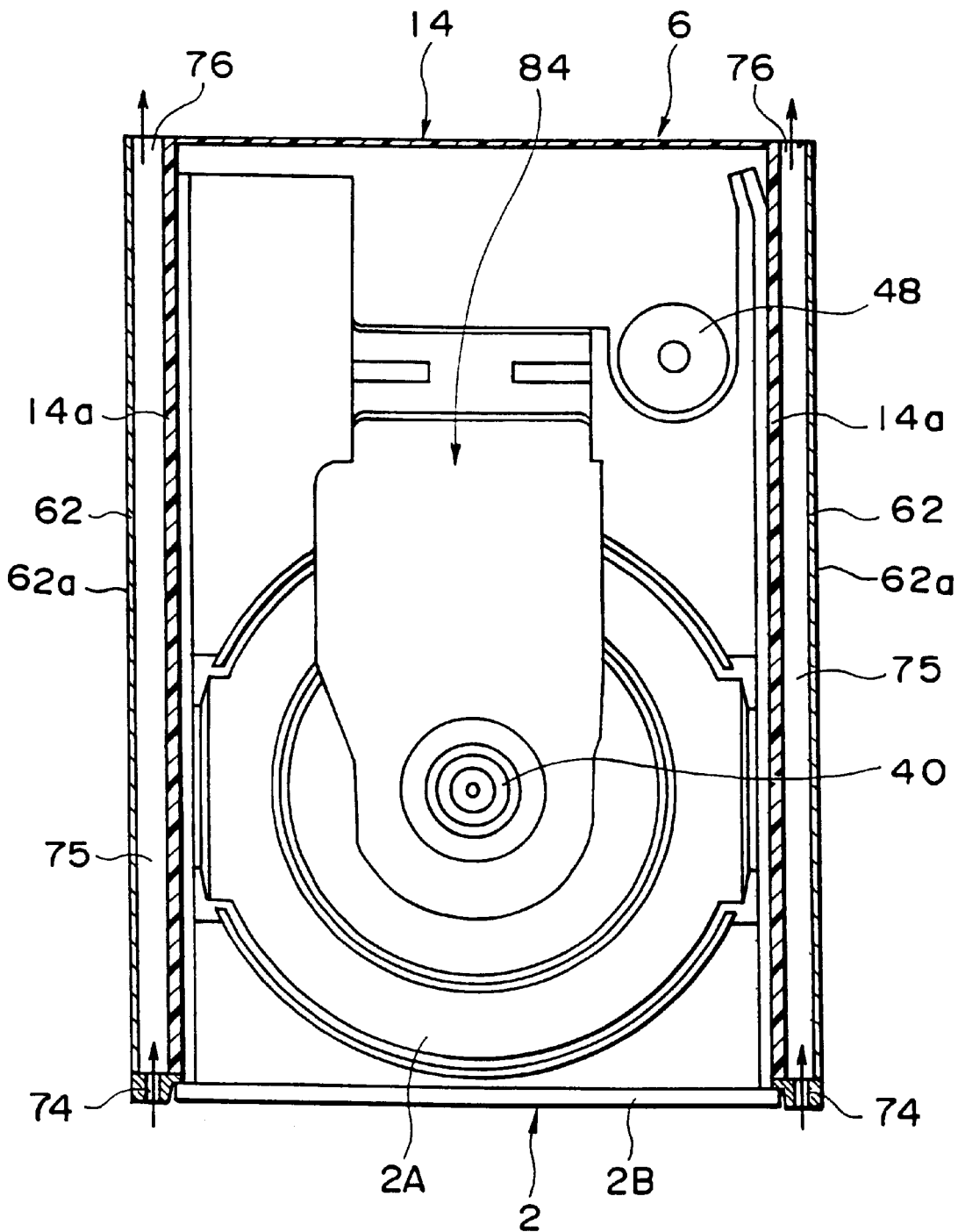
FIG. 21 is a plan view, partly sectioned, for explaining the dust-proof structure of the optical disk device to which the present invention is applied.

A modification of the intake passage 75 will now be described with reference to FIG. 21.

In this modification, intake ports 74 are formed at right and left ends of the front panel 60 of the disk device body 6 on both sides of the tray entrance/exit opening 4, and a pair of right and left intake passages 75 are formed between right and left side plates 14a of a chassis 14 and right and left side plates 62a of the upper cover 62 to extend parallel to the directions of arrows a and a'. The pair of right and left intake passages 75 are connected at their front ends to the pair of right and left intake ports 74, respectively, and discharge ports 76 are formed at rear ends of the intake passages 75.

With that construction, the pair of right and left intake passages 75 can be perfectly isolated by both the right and left side plates 14a of the chassis 14 from the disk loading space 84 in the disk device body 6, and the open air vigorously sucked through the pair of right and left intake ports 74 can be linearly and smoothly forwarded to the interior of the computer body 111 through the pair of right and left discharge ports 76. It is hence possible to more surely avoid dirt and dust from being sucked into the disk loading space 84 within the disk device body 6 together with open air.

[Description of Sealing Structure of Tray Entrance/Exit Opening]

A sealing structure of the tray entrance/exit opening 4 of the optical disk device 5 will be described below with reference to FIGS. 15 to 18.

The tray body 2A and the tray front panel 2B jointly constituting the disk tray 2 are each formed of a synthetic resin. At both right and left ends of a vertical front surface 2a of the tray body 2A, a pair of right and left fitting lugs 85 are integrally formed to project from the front surface 2a perpendicularly in respective laterally outward directions. Another fitting lug 86 is integrally formed along an upper edge of the front surface 2a to vertically project upward from the front surface 2a. A pair of right and left fitting recesses 87 are formed at a lower edge of the front surface 2a in positions near both right and left ends thereof. Further, at both right and left ends of a vertical rear surface 2b of the tray front panel 2B, L-shaped fitting lugs 88 are integrally formed to extend first vertically downward and then bend at a right angle to face each other. One fitting lug.89 is integrally formed at the center of an upper portion of the rear surface 2b to project vertically downward, and a pair of right and left fitting bosses 90 are integrally formed in a lower portion of the rear surface 2b at positions near both right and left ends thereof. The fitting lugs 85, 86, the fitting recesses 87, the L-shaped fitting lugs 88, the fitting lug 89, and the fitting bosses 90 constitute the fitting joints between the tray body 2A and the tray front panel 2B.

On the rear surface 2b of the tray front panel 2B, there are integrally formed a horizontal rib 91 for horizontally interconnecting the pair of right and left L-shaped fitting lugs 88 and an upper end of the fitting lug 89 in the upper central portion of the rear surface 2b, and a total of four vertical ribs 92 extending downward from the horizontal rib 91. The fitting lug 89 is integrally formed to project downward from a central portion of the horizontal rib 91, and the pair of right and left fitting bosses 90 are integrally formed at lower ends of the vertical ribs 92 near the right and left side ends. A peripheral rib 93 is integrally formed along an outer periphery of the rear surface 2b of the tray front panel 2B. Further, since the pair of right and left L-shaped fitting lugs 88 and the fitting lug 89 in the upper central portion of the rear surface 2b are formed by being undercut from below, three cutouts 94 are formed in a lower portion of the peripheral rib 93 for undercutting operation at positions corresponding to the L-shaped fitting lugs 88 and the upper central fitting lug 89.

When assembling the tray front panel 2B to the front surface 2a of the tray body 2A, the pair of right and left L-shaped fitting lugs 88 on the tray front panel 2B are engaged parallel with the pair of right and left fitting lugs 85 on the tray body 2A from above, whereupon the upper central fitting lug 89 is engaged with a central portion of the fitting lug 86 and the pair of right and left fitting bosses 90 are engaged in the pair of right and left fitting recesses 87, respectively, after sliding over the front surface 2a of the tray body 2A. In the thus-fitted condition, the tray front panel 2B is positioned in any of three-dimensional directions, i.e., vertically, transversely and longitudinally.

In connection with the above fitting step, right and left ends of the tray front panel 2B are formed to warp in the direction of arrow a' from the central portion thereof beforehand, as indicated by a one-dot-chain line in FIG. 18B, and the tray front panel 2B is assembled to the front surface 2a of the tray body 2A through the above fitting joints in a condition where the right and left ends are flexed in the direction of arrow a against the resiliency of the tray front panel 2B. By so fitting, in a completely assembled state, the tray body 2A and the tray front panel 2B are held in pressure contact with each other between the total of four vertical ribs 92 and the pair of right and left L-shaped fitting lugs 88 while being urged in the opposite directions of arrow a and a' under resilient reaction forces developed at the right and left ends 2bb of the tray front panel 2B in the direction of arrow a'. As a result, the tray front panel 2B can be assembled to the tray body 2A without plays therebetween and the disk tray 2 with high quality can be realized.

In the above disk tray 2, however, because the three cutouts 94 are formed in the rear surface of the tray front panel 2B for undercutting operation as described above, the tray entrance/exit opening 4 formed in the front panel 60 of the disk device body 6 cannot be easily sealed off by the tray front panel 2B.

Figure 16:
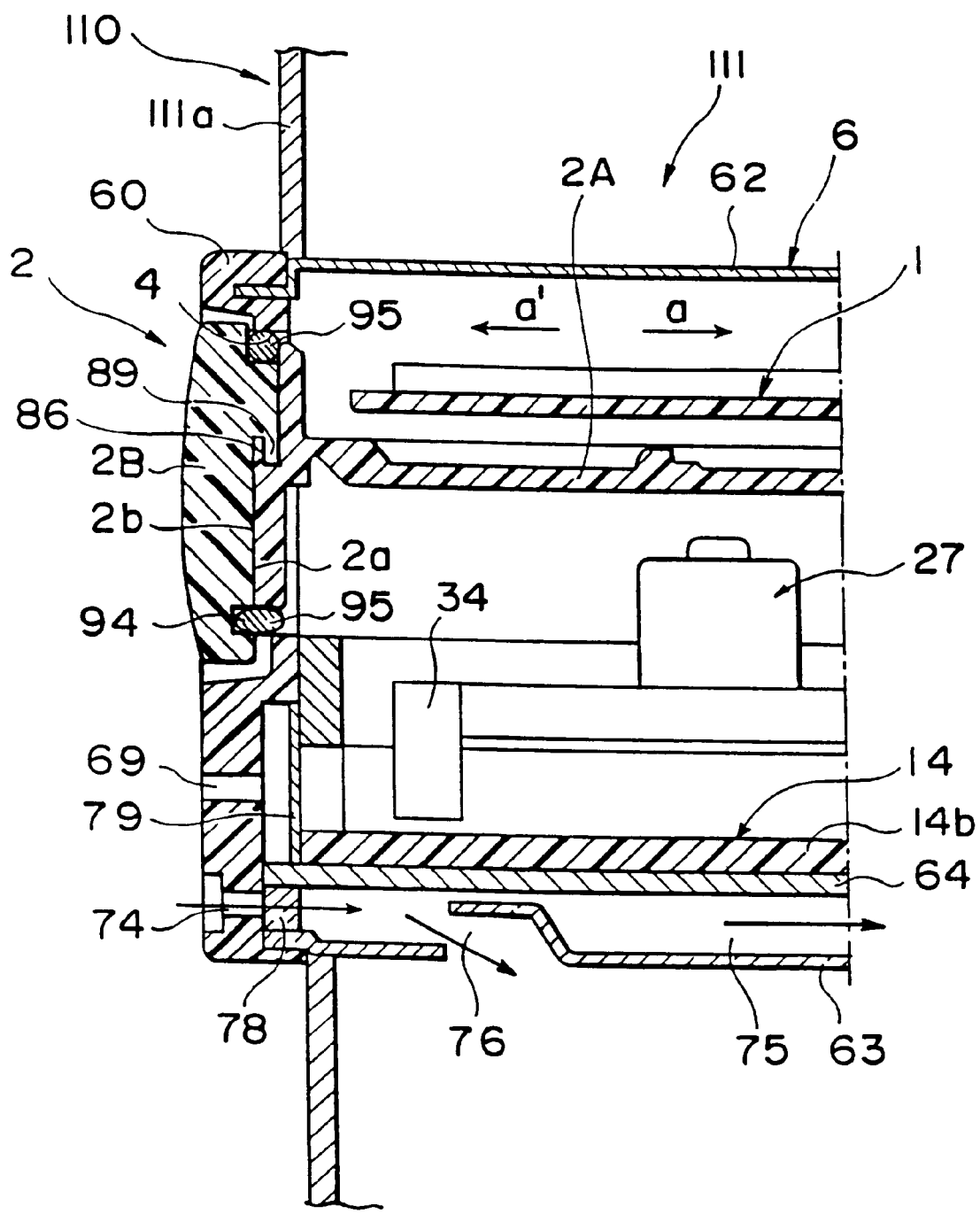
FIG. 16 is an enlarged side sectional view of principal part shown in FIG. 15.
Figure 17:
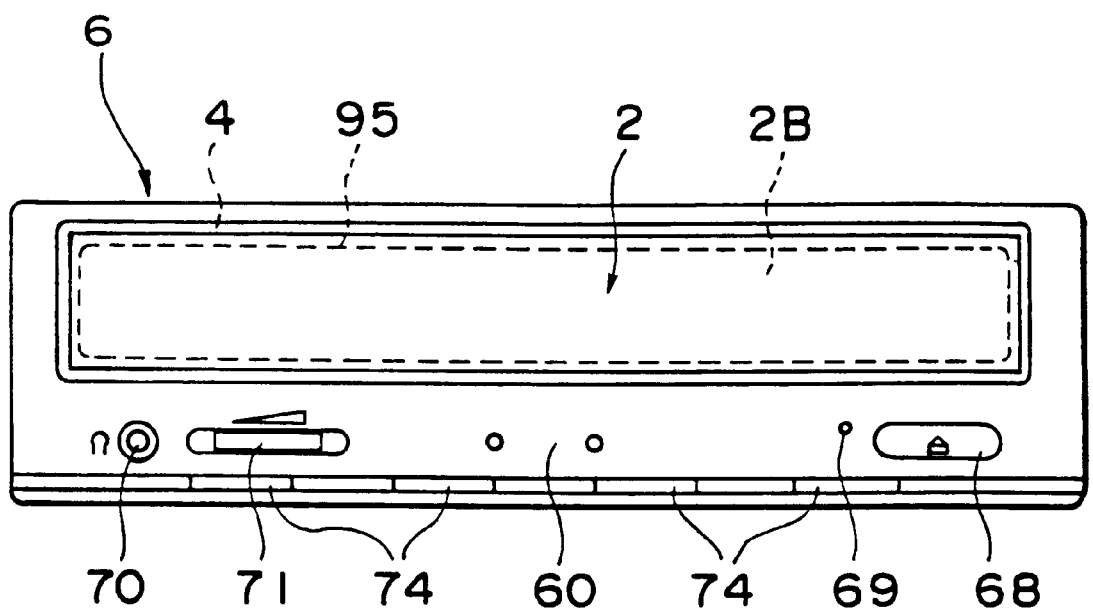
FIG. 17 is a front view of a front panel of the optical disk device shown in FIG. 15.
Figure 19A:
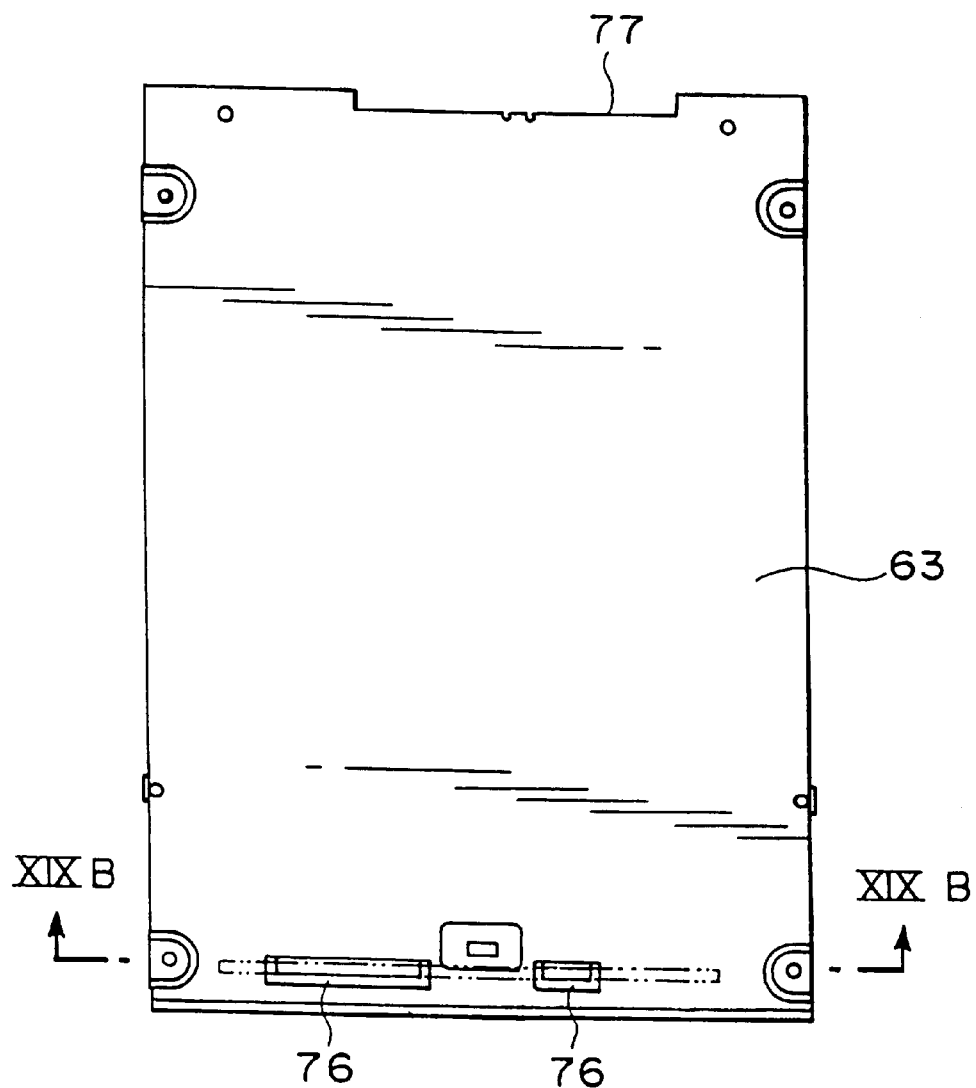
FIG. 19A is a plan view of a lower cover in FIG. 15.
Figure 19B:
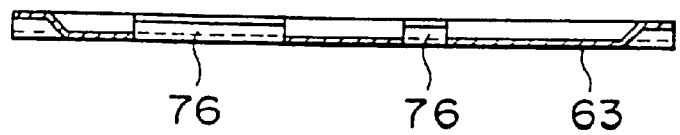
FIG. 19B is a sectional view taken along line XIX—XIX in FIG. 19A.

To eliminate such a drawback, in the optical disk device 5 of the embodiment, an endless annular elastic member 95 being circular in cross-section is formed of rubber or a soft synthetic resin and is fitted onto the rear surface of the tray front panel 2B in engaging relation to a recess defined by the peripheral rib 93 such that the annular elastic member 95 surrounds the pair of right and left L-shaped fitting lugs 88, the horizontal rib 91 and the three cutouts 94, as shown in FIGS. 15, 16 and 18. On that occasion, the annular elastic member 95 is fitted in a state where the member 95 is subject to initial tensile stresses.

Consequently, as shown in FIGS. 15 and 16, when the disk tray 2 is completely loaded into the disk device body 6 in the direction of arrow a', the annular elastic member 95 is forced to come into and closely contact with an inner peripheral surface of the tray entrance/exit opening 4 against the resiliency, and simultaneously a lower edge portion of the annular elastic member 95 is forced at three positions to come into the three cutouts 94 against the resiliency. The tray entrance/exit opening 4 and the three cutouts 94 can be thereby surely sealed off.

Because of the annular elastic member 95 being circular in cross-section, the annular elastic member 95 can easily rotate about the center of circular section under frictional forces produced upon an outer periphery of the annular elastic member 95 coming into pressure contact with the inner peripheral surface of the tray entrance/exit opening 4. It is therefore ensured that the outer periphery of the annular elastic member 95 can be smoothly and reliably brought into pressure contact with the inner peripheral surface of the tray entrance/exit opening 4, and hence the tray entrance/exit opening 4 can be reliably sealed off without imposing a large load to the loading motor 28 for the disk tray 2 shown in FIGS. 3 and 6.

As a result of that the tray entrance/exit opening 4 can be sealed off in the condition where the disk tray 2 is completely loaded into the disk device body 6, as mentioned above, dirt and dust are avoided from entering the disk device body 6 through the tray entrance/exit opening 4 and the optical disk device 5 can be given with a high dust-proof effect. Furthermore, because of being in the endless form, the annular elastic member 95 can be easily attached and detached to and from the disk tray 2 by stretching it appropriately against the resiliency thereof. Assembly and replacement of the annular elastic member 95 is thus easy to carry out. In addition, a part cost of the annular elastic member 95 is very low.

[Description of Disk Chucking Mechanism]

A disk chucking mechanism will be described below with reference to FIGS. 22 and 23. A disk clamper 53 in the form of a circular plate is formed of a synthetic resin and serves as a non-magnetic member, and a flange 53a is integrally formed along an outer periphery of the disk clamper 53. A circular recess 53b being open downward and a central pin 53c projecting downward from the center of the circular recess 53b are integrally formed to lie at an elevated position in a central portion of the disk clamper 53. Annular magnet 97 and yoke 98 are embedded in the circular recess 53b around the central pin 53c to position horizontally in a vertically stacked state by, e.g., insert molding. The yoke 98 is horizontally placed on an upper surface of the magnet 97. The magnet 97 is magnetized in the vertical direction (i.e., the axial direction of the central pin 53c) so that magnetic attracting forces of the magnet 97 acts in the vertical direction.

The upper cover 62 formed of a metal plate and serving as a magnetic member is horizontally arranged on a clamper support member 52 which is formed of a metal plate or the like and has a clamper receiver 52a for supporting the flange 53a of the disk clamper 53 from below. Thus, the upper cover 62 serving as a magnetic member is horizontally arranged over the disk clamper 53. The disk table 40 and a centering guide 40a provided on the disk table 40 in its center portion are each formed of a metal and serve as magnetic members. A central reference hole 40b is formed at the center of the centering guide 40a.

Figure 22:
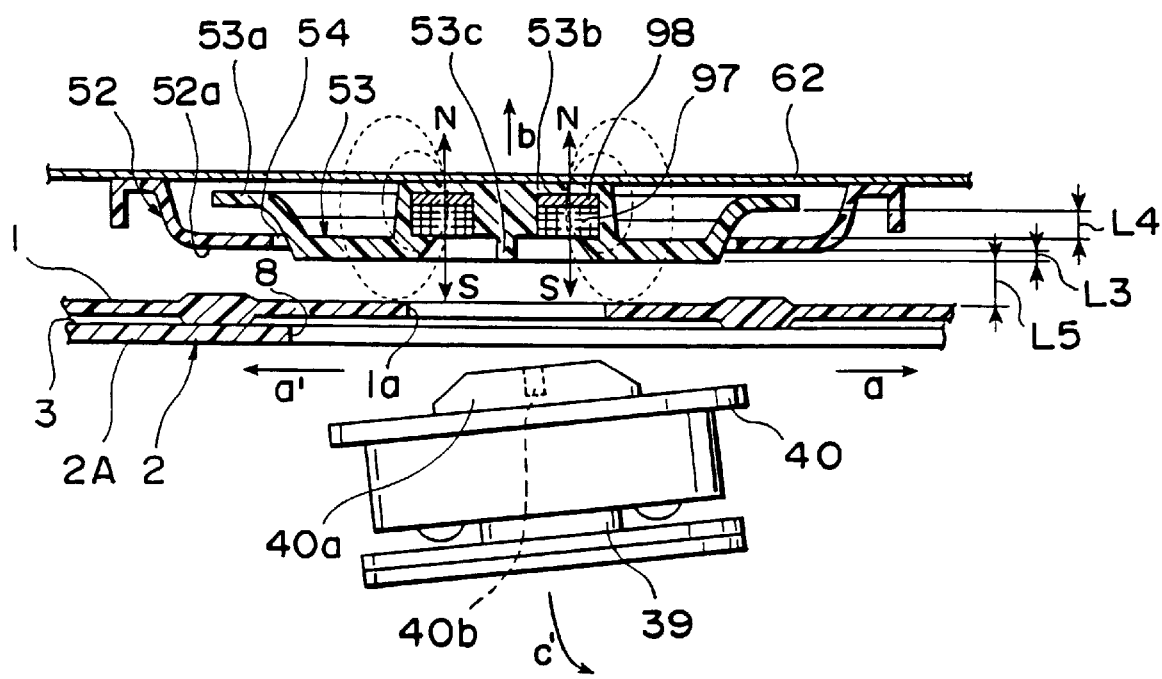
FIG. 22 is a side view, partly sectioned, showing an dechucked condition of a disk chucking mechanism in the optical disk device to which the present invention is applied.
Figure 23:
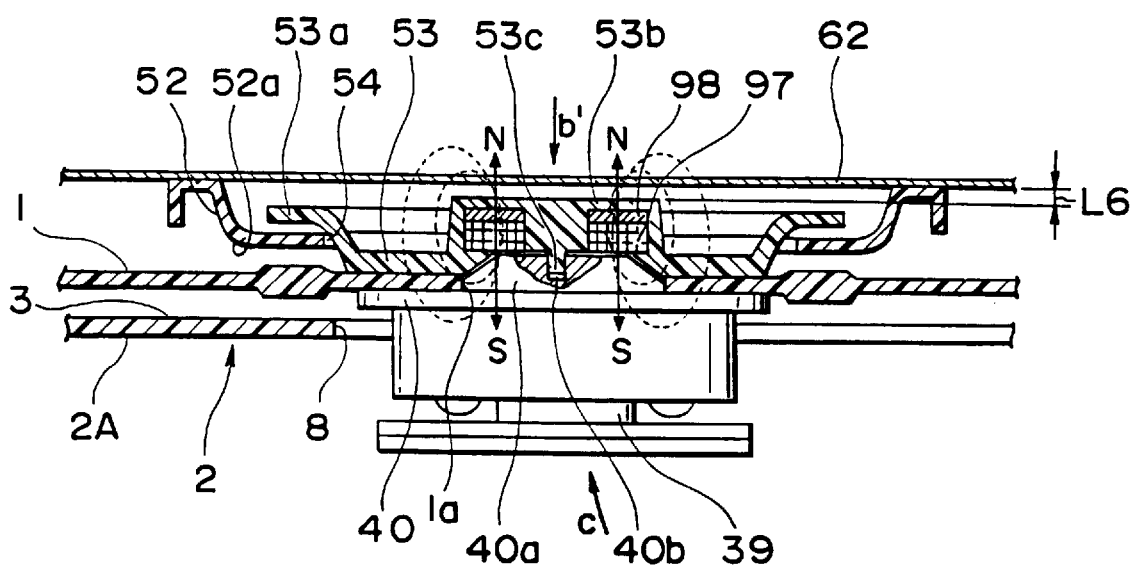
FIG. 23 is a side view, partly sectioned, showing an chucked condition of the disk chucking mechanism in FIG. 22.

With the disk chucking mechanism thus constructed, in the unloaded condition shown in FIG. 22, since the disk table 40 is lowered in the direction of arrow c' to the descended position, the vertical magnetic attracting forces produced by the magnet 97 in the disk clamper 53 acts between the disk clamper 53 and the upper cover 62, causing the disk clamper 53 to move up in the direction of arrow b from the chucked position shown in FIG. 23 to the ascended position. The disk clamper 53 is thereby magnetically attracted to a lower surface of the upper cover 62. In this connection, since the yoke 98 is placed horizontally on the upper surface of the magnet 97, the magnetic attracting forces acting upward from the magnet 97 are smaller than those acting downward from the magnet 97. Furthermore, since the disk clamper 53 is held in abutment with the lower surface of the upper cover 62 through an upper central wall of the circular recess 53b, the magnetic attracting forces acting upward from the magnet 97 are further weakened by the presence of the upper central wall of the circular recess 53b; hence the disk clamper 53 is attracted to the lower surface of the upper cover 62 under relatively weak magnetic attracting forces.

Figure 7:
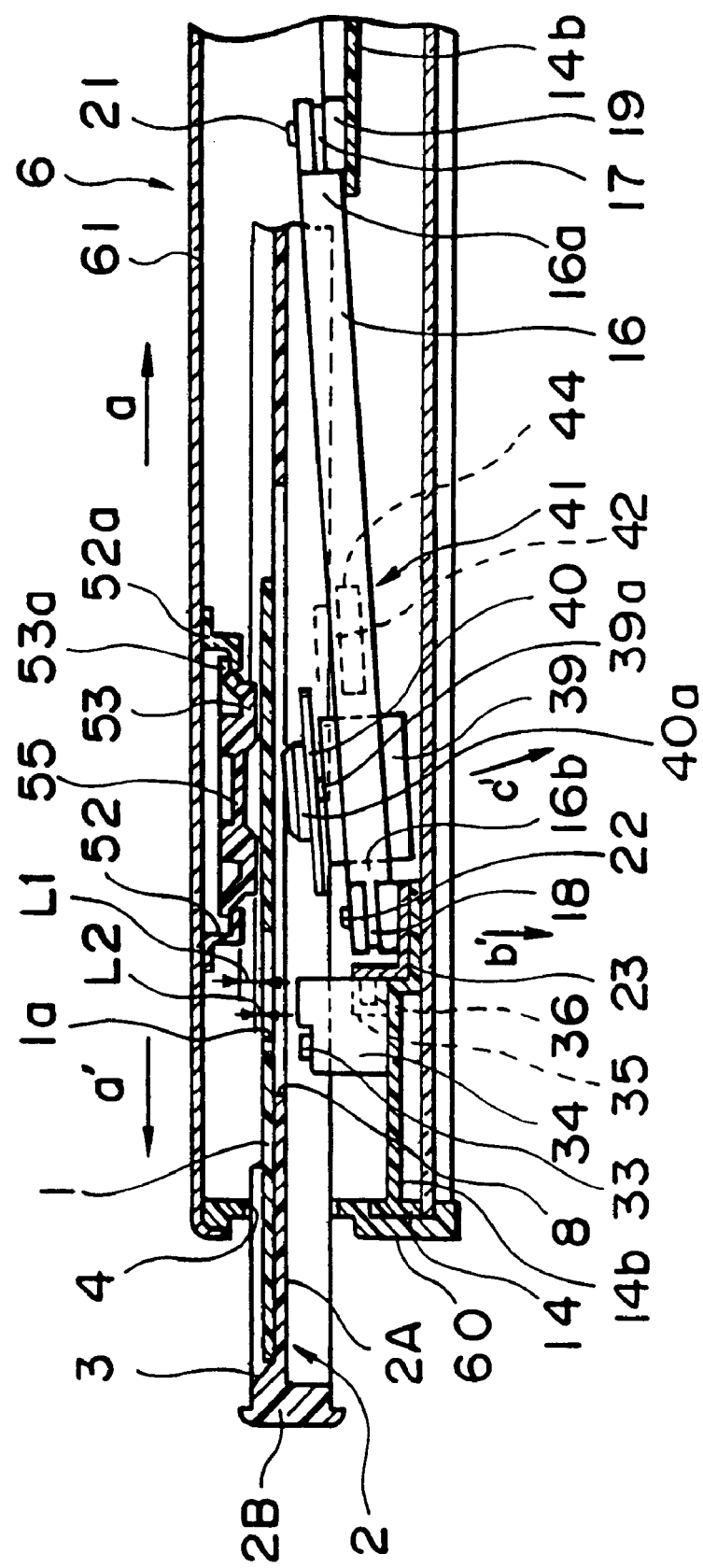
FIG. 7 is a side sectional view of the previously proposed optical disk device in the unloaded condition.
Figure 8:
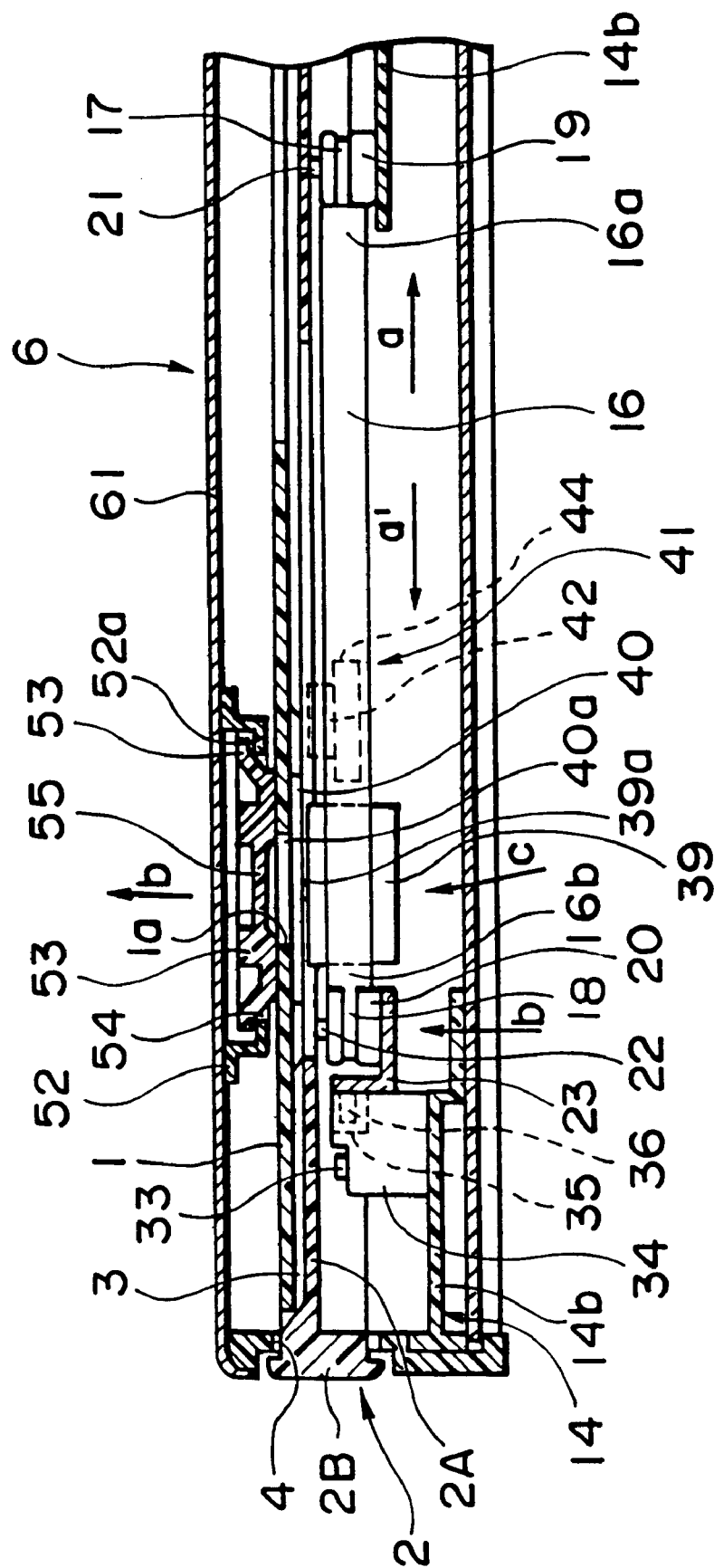
FIG. 8 is a side sectional view of the previously proposed optical disk device in the loaded condition.
Figure 9:
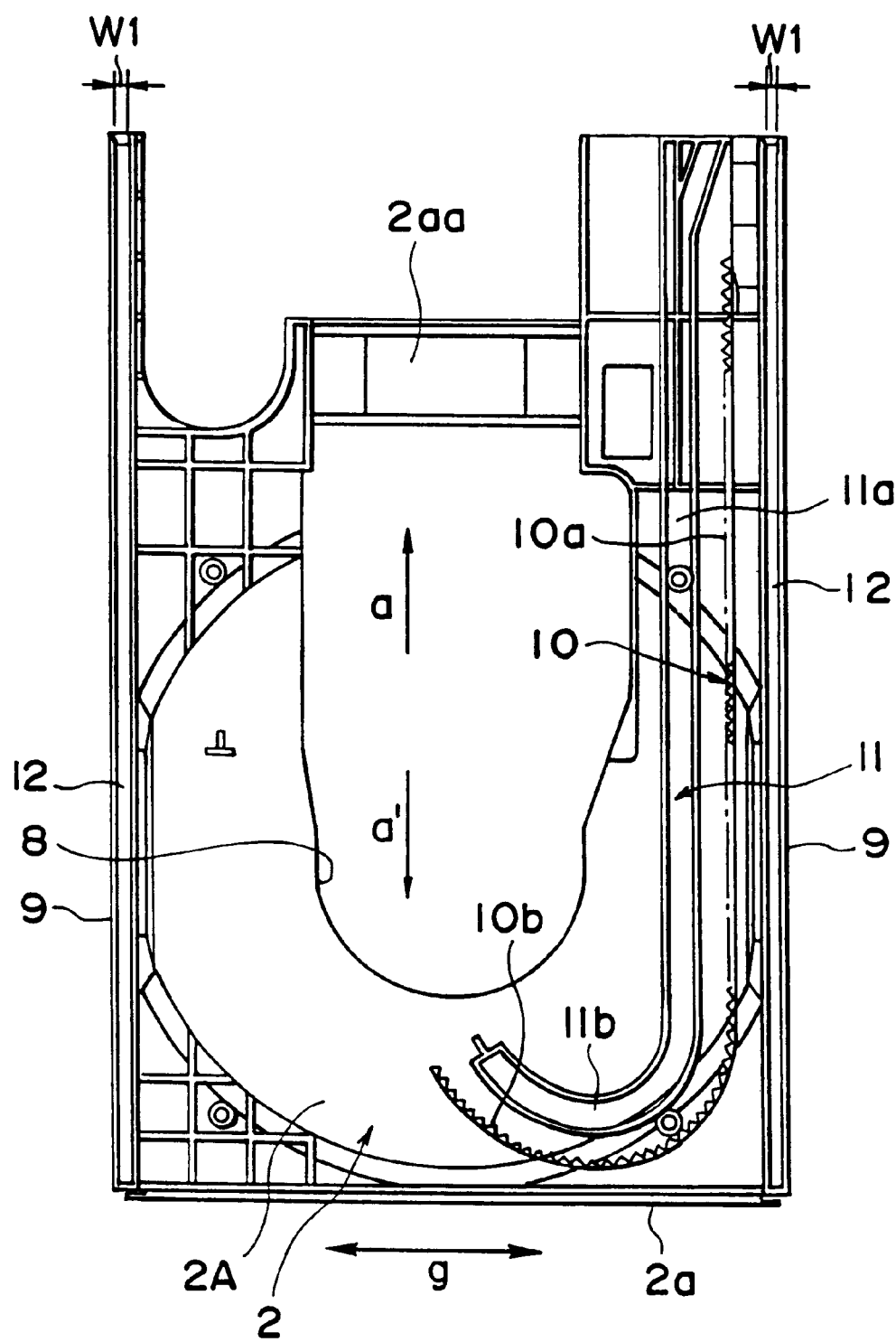
FIG. 9 is a bottom view of a disk tray in the previously proposed optical disk device.
Figure 10:
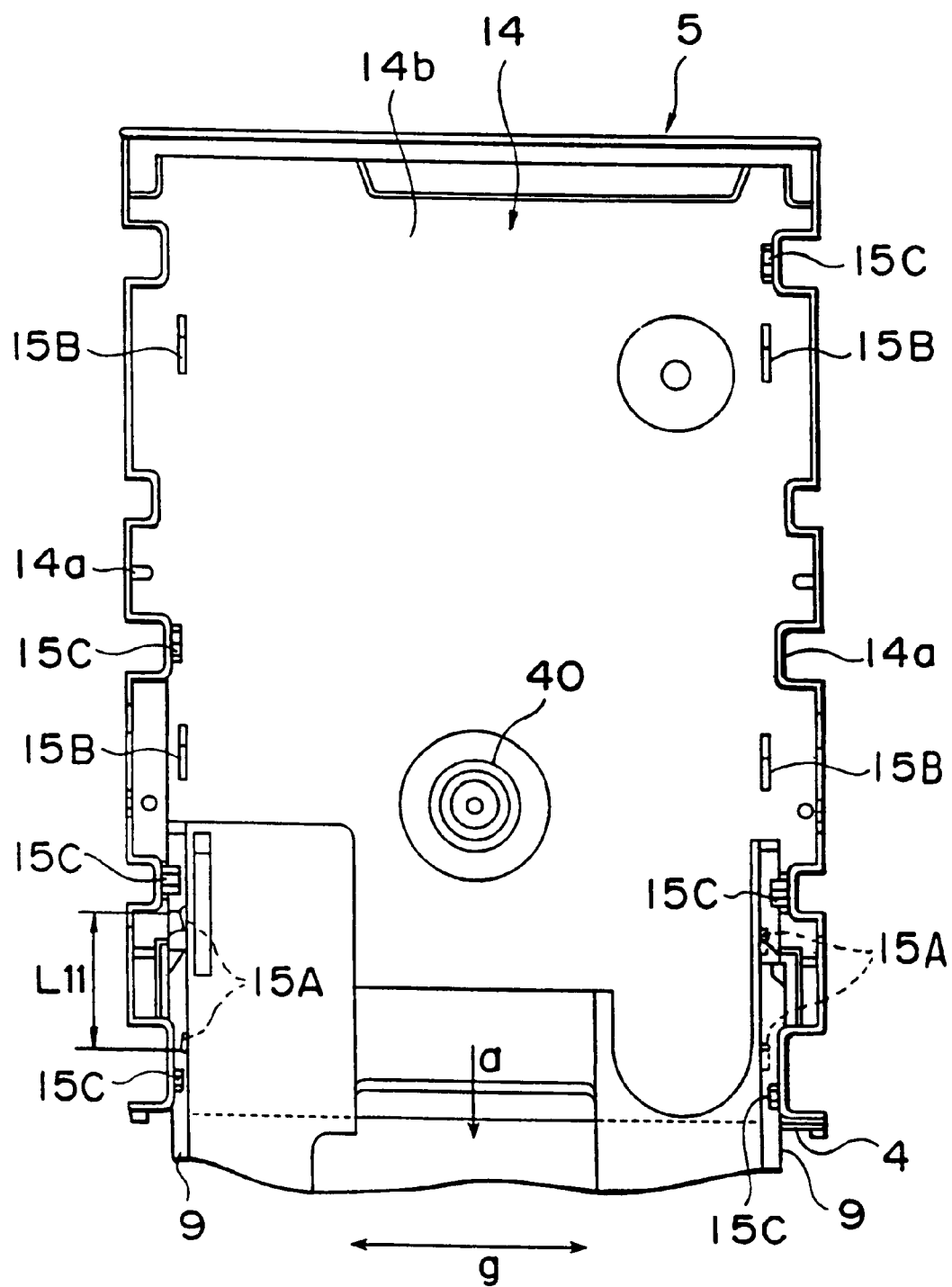
FIG. 10 is a plan view, partly sectioned, for explaining a disk tray guide mechanism in the previously proposed optical disk device in the unloaded condition.
Figure 11:
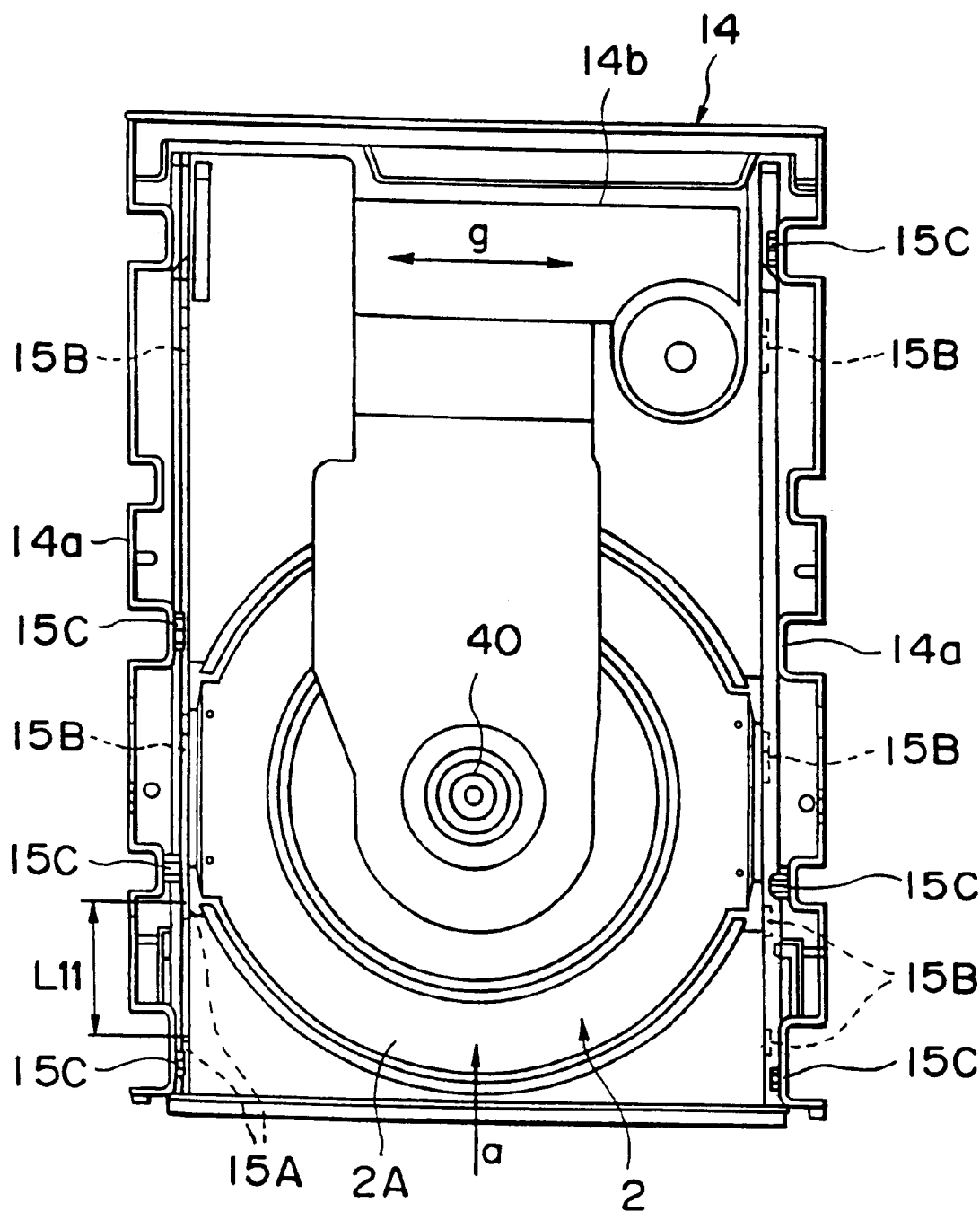
FIG. 11 is a plan view, partly sectioned, of the disk tray guide mechanism in the loaded condition.
Figure 12:
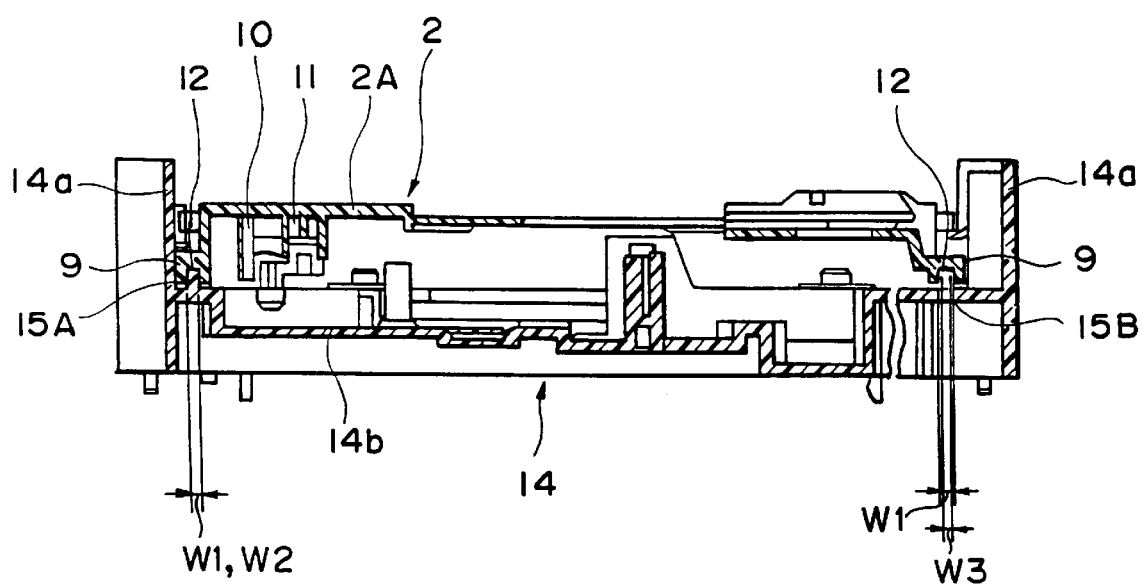
FIG. 12 is a front sectional view of the disk tray and the chassis of the disk tray guide mechanism in the loaded condition.

With the disk clamper 53 moving up in the direction of arrow b to the ascended position where it is held in abutment with the lower surface of the upper cover 62, a clearance L3 between a lower surface of the clamper support member 52 and a lower surface of the disk clamper 53 is smaller than the clearance L1 shown in FIG. 7 by an amount L4 by which the disk clamper 53 is raised above the clamper support member 52.

Accordingly, on condition that a clearance L5 between the lower surface of the disk clamper 53 and an upper surface of the optical disk 1 to be loaded in a horizontal posture rested on the disk tray 2 is set such a minimum value as to ensure no interference therebetween in the unloaded condition, a total clearance L3+L5 between the lower surface of the clamper support member 52 and the upper surface of the optical disk 1 can also be made smaller than the total clearance L1+L2 between the lower surface of the clamper support member 52 and the upper surface of the optical disk 1 shown in FIG. 7 by the ascent amount L4 of the disk clamper 53. In other words, the relationship of (L3+L5)< (L1+L2) is derived from L3+L5+L4=L1+L2. As a result, a thickness of the optical disk device can be reduced in its entirety.

Next, in the chucked condition shown in FIG. 23, the centering guide 40a of the disk table 40 moving upward in the direction of arrow c is fitted to the central hole 1a of the optical disk 1 from below, and the optical disk 1 is floated above the disk tray 2 by the disk table 40. At this time, the magnetic member given by the centering guide 40a of the disk table 40 comes so close to the magnet 97 in the disk clamper 53 that the spacing between the magnet 97 and the centering guide 1a is smaller than the spacing between the magnet 97 and the upper cover 62. Consequently, the disk clamper 53 is attracted downward in the direction of arrow b' under the vertical magnetic attracting forces acting between the magnet 97 and the centering guide 40a and is descended in the direction of arrow b' by a distance corresponding to a clearance L6, whereby the disk clamper 53 strongly chucks the optical disk 1 onto the disk table 40. In the chucked state, the optical disk 1 is ascended in the direction of arrow b and the clearance between the lower surface of the clamper support member 52 and the upper surface of the optical disk 1 becomes smaller than L5.

In addition, since the magnetic attracting forces acting downward from the magnet 97 are larger than those acting upward from the magnet 97, the disk clamper 53 can be easily separated from the upper cover 62 and strongly brought into pressure contact with the optical disk 1. Stated otherwise, by moving the disk table 40 to come closer to the disk clamper 53 from below and to move away from it downward, operations of descending and ascending the disk clamper 53 under the vertical magnetically attracting forces produced by the magnet 97 can be surely reversely switched from one to the other. As a result, the optical disk 1 can be smoothly chucked and dechucked to and from the disk table 40.

In the above operation of chucking the optical disk 1, the central pin 53c of the disk clamper 53 is guided into the central reference hole 40b formed at the center of the centering guide 40a of the disk table 40 to perform automatic centering of the disk clamper 53; that is, the disk clamper 53 is automatically positioned at the center of the disk table 40. Accordingly, when the optical disk 1 is driven by the disk table 40 to rotate at a high speed together with the disk clamper 53 during the recording and/or reproducing of the optical disk 1, the disk table 40 is not subject to misalignment due to an eccentric load and the optical disk 1 can be stably rotated at a high speed. In the transition process from the chucked condition shown in FIG. 23 to the dechucked condition shown in FIG. 22, the flange 53a of the disk clamper 53 is caught by the clamper receiver 52a of the clamper support member 52 when the disk table 40 is descended in the direction of arrow c'. The disk clamper 53 is therefore forcibly separated from the disk table 40.

[Description of Structure of Pushing Up Disk Clamper by Disk Tray]

Figure 24:
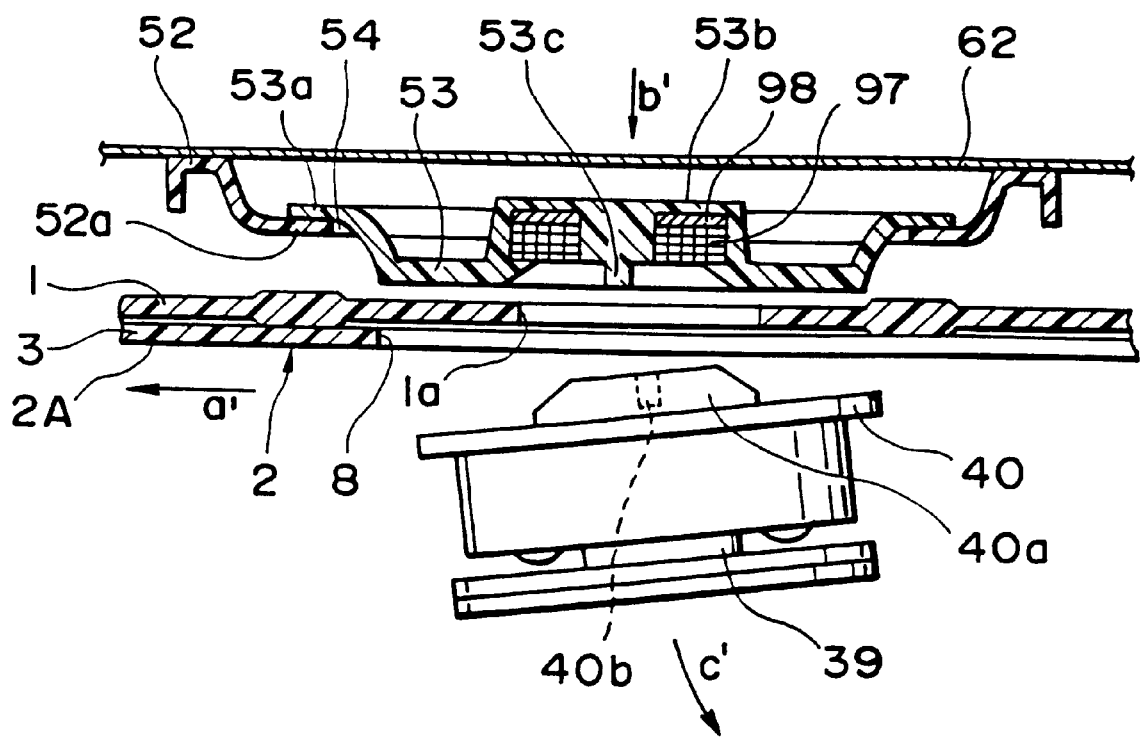
FIG. 24 is a side view, partly sectioned, showing a suspended state of a disk clamper in the dechucked condition of the disk chucking mechanism in FIG. 22.
Figure 25:
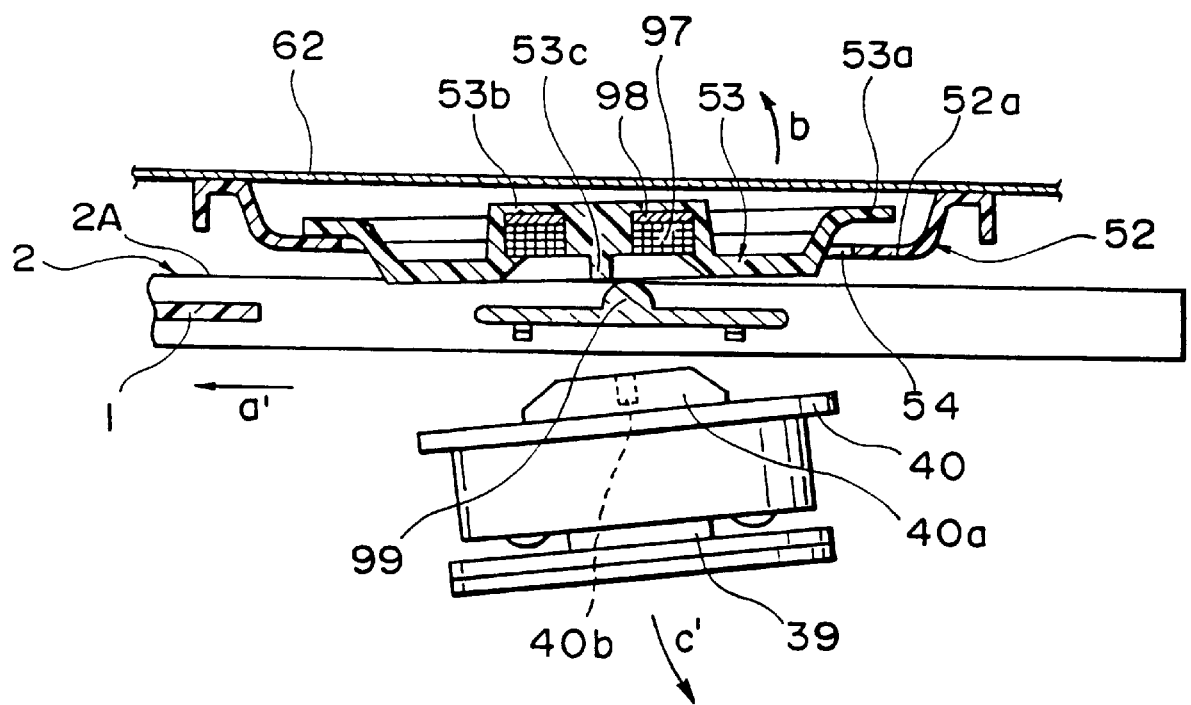
FIG. 25 is a side view, partly sectioned, showing how the disk clamper in the suspended state in FIG. 23 is pushed up by a pushing boss on the disk tray.

A structure of pushing up the disk clamper 53 by the disk tray 2 will be described below with reference to FIGS. 24 and 25.

A horizontal bridging portion 2aa is integrally formed at a rear end (viewed in the direction of arrow a) of the tray body 2A of the disk tray 2 behind the bottom opening 8. A pair of right and left pushing bosses 99 are integrally formed on the bridging portion 2aa to extend parallel to the direction of width of the disk tray 2 (in the direction of arrow g). The pushing bosses 99 are each formed to have a curved surface which is substantially semicircular in cross-section.

When the disk tray 2 is unloaded in the direction of arrow a' after the dechucking operation shown in FIG. 24, the pushing bosses 99 on the disk play 2 come into below the disk clamper 53 in the direction of arrow a' and forcibly push the disk clamper 53 upward in the direction of arrow b. With the upward movement of the disk clamper 53, the vertical magnetically attracting forces produced by the magnet 97 in the disk clamper 53 begin to act on the upper cover 62 so that, as shown in FIG. 22, the disk clamper 53 is automatically moved up in the direction of arrow b to the elevated position and then horizontally attracted to the lower surface of the upper cover 62.

With a very simple structure that the bosses 99 for pushing up the disk clamper 53 are just integrally formed on the disk tray 2, the disk clamper 53 can be surely raised to the elevated position in the unloading operation of the disk tray 2, and the optical disk 1 is avoided from interfering with the disk clamper 53 in the subsequent loading operation, resulting in a high degree of safety and reliability.

[Description of Disk Tray Guide Mechanism]

A disk tray guide mechanism will now be described below with reference to FIGS. 27 to 31.

The disk tray guide mechanism includes two types of slide guide grooves 101, 102 formed in lower surfaces of the pair of right and left guide rails 9, which are provided on the tray body 2A of the disk tray 2, and extended parallel to the directions of arrows a and a'. One slide guide groove 101 is formed to have a non-uniform width, and is made up of a main guide groove portion 101a having a smaller groove width W11 and a pair of sub-guide groove portions 101b, 101c formed in front and rear end portions of the main guide groove portion 101a (i.e., both end portions thereof in the directions of arrows a and a' and having a larger groove width W12 (W11<W12). The other slide guide groove 102 has a flat or linear shape with the same groove width as the smaller groove width W11 of the main guide groove portion 101a.

The disk tray guide mechanism also includes a plurality of main guide ribs 103A, 103B, 103C and one type of sub-guide ribs 104 which are integrally formed on a bottom portion 14b of the chassis 14 to lie in two lines parallel to the directions of arrows a and a' at positions near both right and left side ends thereof. Specifically, the two types of total five guide ribs, i.e., three main guide ribs 103A, 103B, 103C and two sub-guide ribs 104, are arranged in a line on the side opposed to one slide guide groove 101 of the disk tray 2, and a total of four to six sub-guide ribs 104 are arranged in a line on the side opposed to the other slide guide groove 102 of the disk tray 2.

In the above arrangement, assuming that the two main guide ribs 103A, 103B, the one main guide rib 103C and the sub-guide ribs 104 have respective widths W13, W14, W15 (i.e., 103=W13, 104=W14, 105=W15) in the transverse direction perpendicular to the directions of arrows a and a', relationships of W15<W13<W14, W11≦W13<W12, W12≧W14>W11, and W15<W11 are held for the widths W13, W14, W15 with respect to the groove width W11 of the main guide groove portion 101a and the groove width W12 of the sub-guide groove portion 101b in the two types of the slide guide grooves 101, 102.

The two main guide ribs 103A, 103B each having a relatively small width W13 are arranged in an area near the tray entrance/exit opening 4, i.e., on the side of the front panel 60 of the disk device body 6, to lie in a line with a small spacing L11 therebetween in the longitudinal direction (the directions of arrows a and a'). The one main guide rib 103C having a relatively large width W14 is arranged in a position near a rear panel 61 of the disk device body 6. The two sub-guide ribs 104 are arranged between the two main guide ribs 103A and 103C. Hence, the two types of main guide ribs 103A and 103C are arranged with a large spacing L12 therebetween in the longitudinal direction of the chassis 14 (i.e., in the directions of arrows a and a'). The large spacing L12 is selected to be several times the small spacing L12 between the two main guide ribs 103A and 103B. Further, as with the related art described above, a plurality of floating-preventive guide ribs 105 are integrally formed on inner surfaces of both the right and left side plates 14a of the chassis 14 in match with top positions of the pair of right and left guide rails 9.

With the disk tray guide mechanism thus constructed, one 101 of the pair of right and left slide guide grooves 101, 102 in the disk tray 2 is slidably engaged with the total of three main guide ribs 103A, 103B, 103C and the two sub-guide ribs 104, the other slide guide groove 102 is slidably engaged with the four to six sub-guide ribs 104, and the pair of right and left guide rails 9 are inserted below the plurality of floating-preventive guide ribs 105. In this condition, the total of three main guide ribs 103A, 103B, 103C serve to avoid the disk tray 2 from wobbling in the direction of arrow g, and all the guide ribs 103A, 103B, 103C, 104 serve to guide both the slide guide grooves 101, 102 in parallel relation while restricting the height of the disk tray 2. As a result, the disk tray 2 can be smoothly slid in the direction of arrow a' within the disk device body 6 for the loading and unloading operation.

Figure 28:
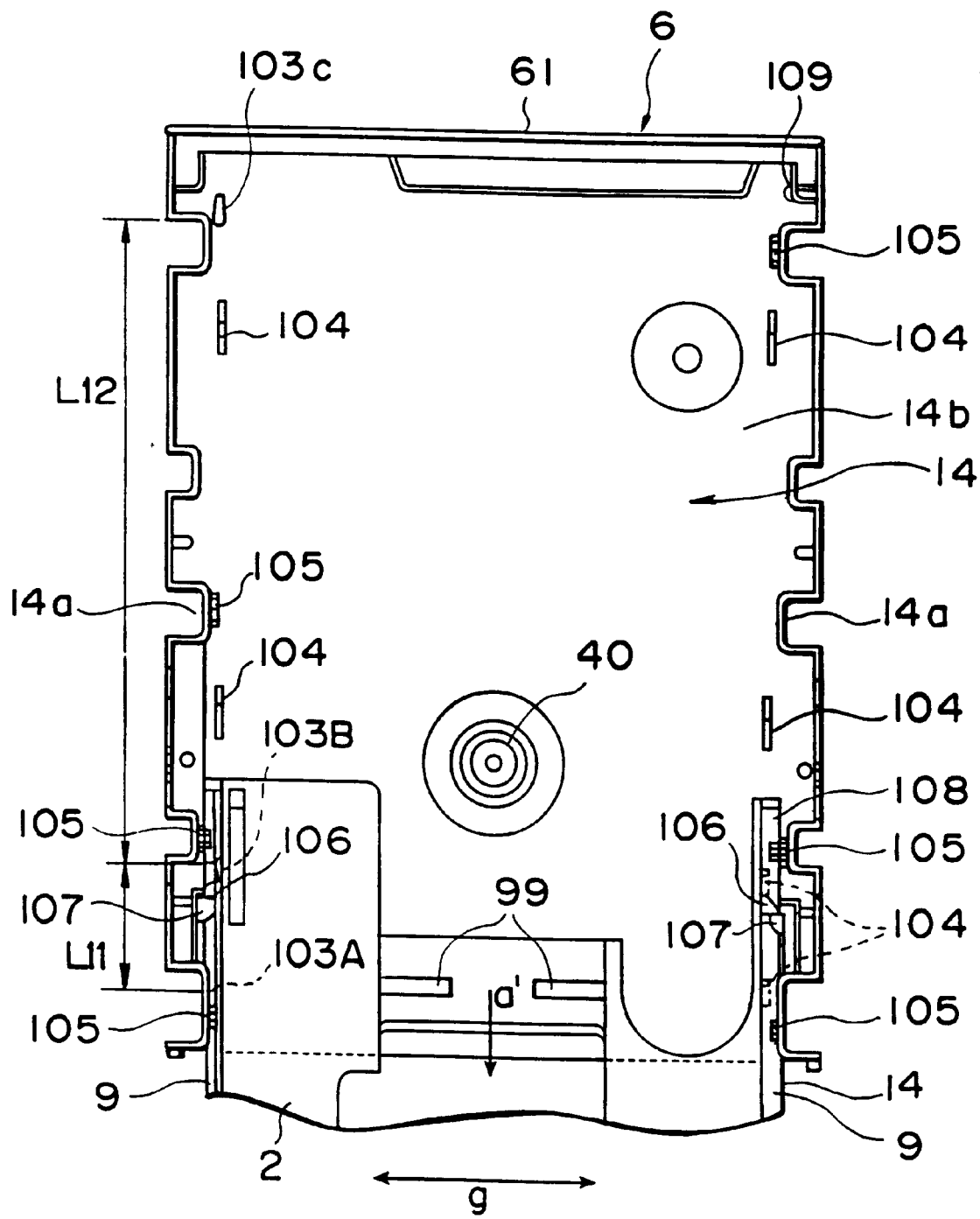
FIG. 28 is a plan view, partly sectioned, of the disk tray guide mechanism in FIG. 27 with the disk tray being in an unloaded condition.
Figure 30:
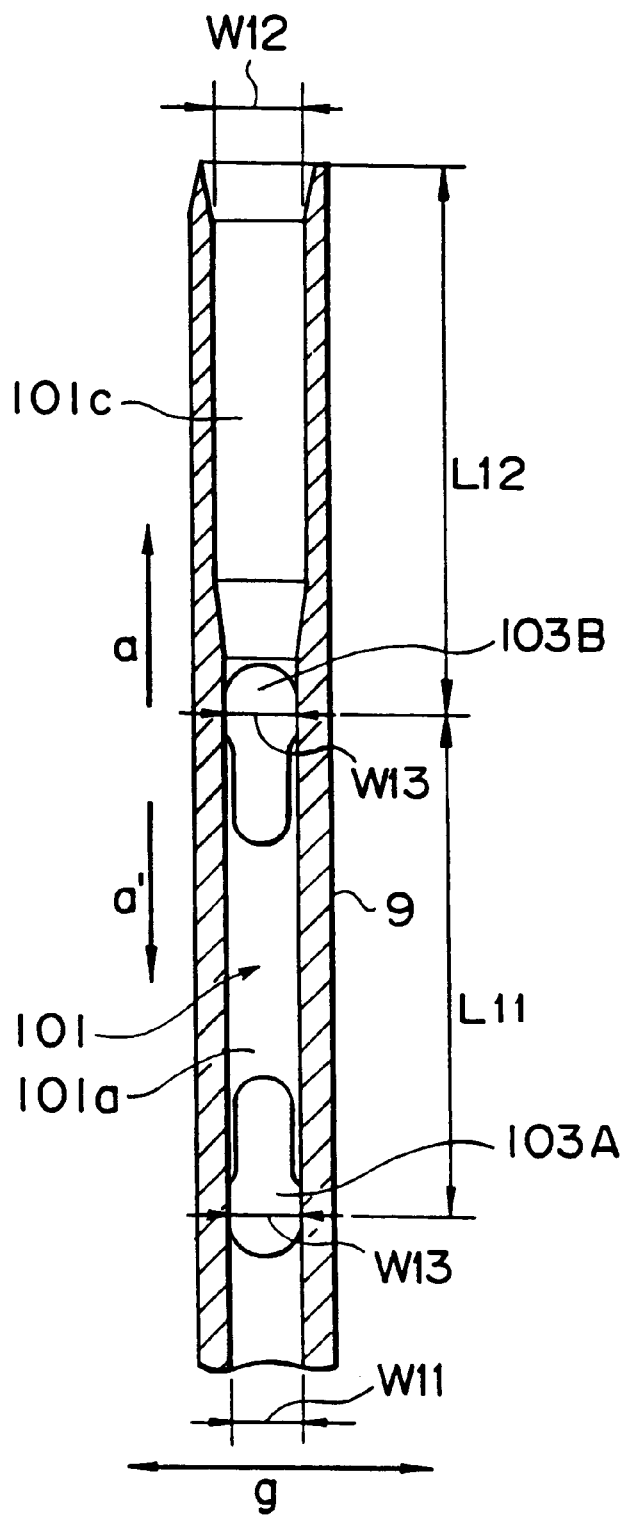
FIG. 30 is a plan view, partly sectioned, of the disk tray guide mechanism in FIG. 27 with the disk tray being in the unloaded condition, the view showing the positional relationship between a main guide rib and a slide guide groove.

In the optical disk device 5, as shown in FIG. 28, at the time the disk tray 2 is completely unloaded out of the disk device body 6 in the direction of arrow a', the disk tray 2 is stopped upon a pair of right and left stopper abutting bosses 106, which are integrally formed on both right and left side surfaces of the tray body 2A of the disk tray 2 in a rear end portion thereof (its end portion in the direction of arrow a), coming into abutment with a pair of right and left stoppers 107 integrally formed on the inner surfaces of both the right and left side plates 14a of the chassis 14 at positions near the tray entrance/exit opening 4. At this time, as shown in FIG. 30, the disk tray 2 is stopped in such a state that the sub-guide groove portion 101c formed in the rear end portion of one slide guide groove 101 of the disk tray 2 is positioned just short of the rear one 103B (on the rear side in the direction of arrow a) of the two main guide ribs 103A, 103B arranged on the side near the tray entrance/exit opening 4. Accordingly, in that completely unloaded condition of the disk tray 2, a rear end portion (an end portion in the direction of arrow a) of the main guide groove portion 101a of the slide guide groove 101 is engaged with the two main guide ribs 103A, 103B, and the disk tray 2 is avoided from wobbling in the width direction of the disk tray 2 (the direction of arrow g) because of the relationship of W13≧W11 between the width W13 of the two main guide ribs 103A, 103B and the groove width W11 of the main guide groove portion 101a.

Figure 29:
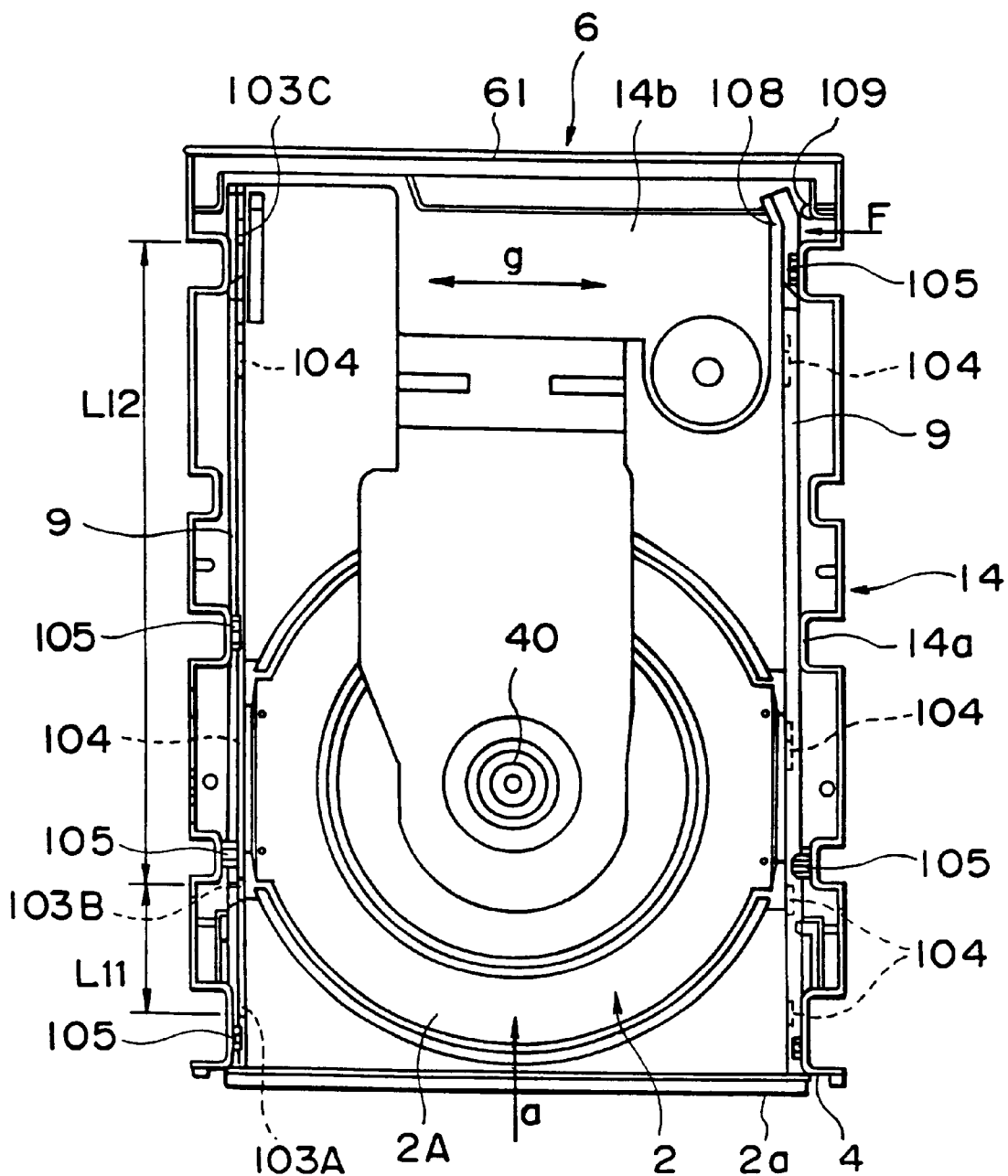
FIG. 29 is a plan view, partly sectioned, of the disk tray guide mechanism in FIG. 27 with the disk tray being in a loaded condition.

Then, when the disk tray 2 is completely loaded into the disk device body 6 in the direction of arrow a as shown in FIG. 29, the disk tray 2 is stopped based on the relationship between the pinion 29 and the arc-shaped portion 10b of the rack 10 shown in FIG. 3. At this time, as shown in FIG. 31, the sub-guide groove portion 101c formed in the rear end portion of one slide guide groove 101 of the disk tray 2 is engaged with the one main guide rib 103C arranged on the side near the rear panel 61 in the direction of arrow a, and the sub-guide groove portion 101b formed in the front end portion of one slide guide groove 101 is engaged with the main guide rib 103A arranged closest to the tray entrance/exit opening 4 in the direction of arrow a.

Accordingly, in that completely unloaded condition, the main guide rib 103B is engaged with a front end portion (an end portion in the direction of arrow a') of the main guide groove portion 101a of the slide guide groove 101, and the main guide rib 103C is engaged with the sub-guide groove portion 101c in the rear end portion of the slide guide groove 101. Further, because of the relationships of W13≧W11 and W14≦W12 between the widths W13, W14 of the two main guide ribs 103B, 103C and the groove widths W11, W12 of the main and sub-guide groove portions 101a, 101c, it is possible to avoid the disk tray 2 from wobbling in the width direction of the disk tray 2 (the direction of arrow g).

Moreover, since the spacing between the main guide ribs 103B and 103C is set to the large spacing L12, the wobbling movement of the disk tray 2 in the width direction (the direction of arrow g) can be suppressed by the two main guide ribs 103B, 103C at two points spaced from the large spacing L2, i.e., at both the longitudinal ends of the disk tray 2. Consequently, the disk tray 2 is subject to no twisting, etc. and hence can be positioned with high accuracy in the width direction when completely loaded.

Figure 31:
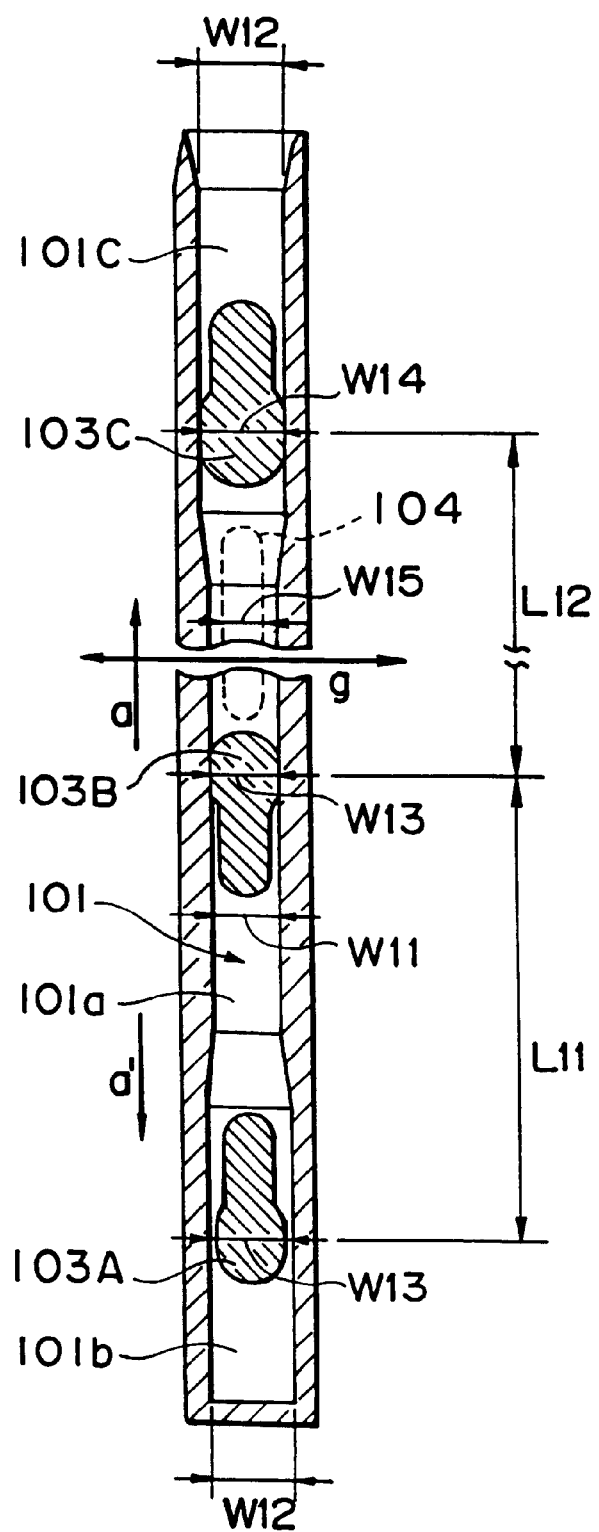
FIG. 31 is a plan view, partly sectioned, of the disk tray guide mechanism in FIG. 27 with the disk tray being in the loaded condition, the view showing the positional relationship between the main guide rib and the slide guide groove.

In addition, with the arrangement that the sub-guide groove portion 101c formed in the rear end portion of the slide guide groove 101 has a length L14 set to be much greater than the length of the main guide rib 103C, when the disk tray 2 is loaded into the disk device body 6 in the direction of arrow a, the sub-guide groove portion 101c formed in the rear end portion of the slide guide groove 101 begins to engage with the main guide rib 103C, as shown in FIG. 31, before the disk tray 2 reaches the completely loaded position shown in FIG. 29. Thus, the function of positioning the disk tray 2 in the width direction at both the longitudinal ends thereof by the two main guide ribs 103B, 103C is started a little earlier than the time the disk tray 2 is completely loaded.

With the above arrangement, in a series of operations from the step of loading of the optical disk 1 into the disk device body 6 with the disk tray 2 to the step of chucking of the optical disk 1 onto the disk table 40, the accuracy in positioning the optical disk 1 with respect to the disk table 40 is improved and the optical disk 1 can be always chucked onto the disk table 40 with high accuracy. As a result, the effect of avoiding a chucking error of the optical disk 1 can be further improved.

[Description of Structure for Preventing Wobbling Movement of Disk Tray During Recording and/or Reproducing of Optical Disk]

Figure 26:
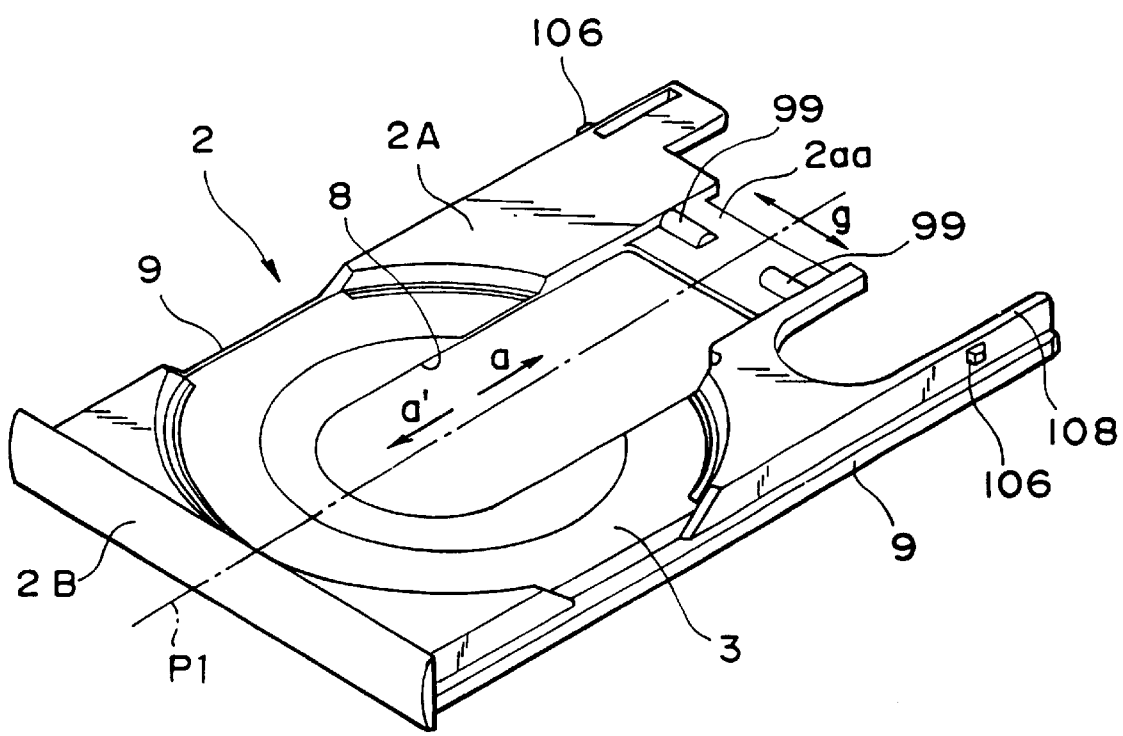
FIG. 26 is a perspective view of the disk tray provided with the pushing bosses in FIG. 23.
Figure 27:
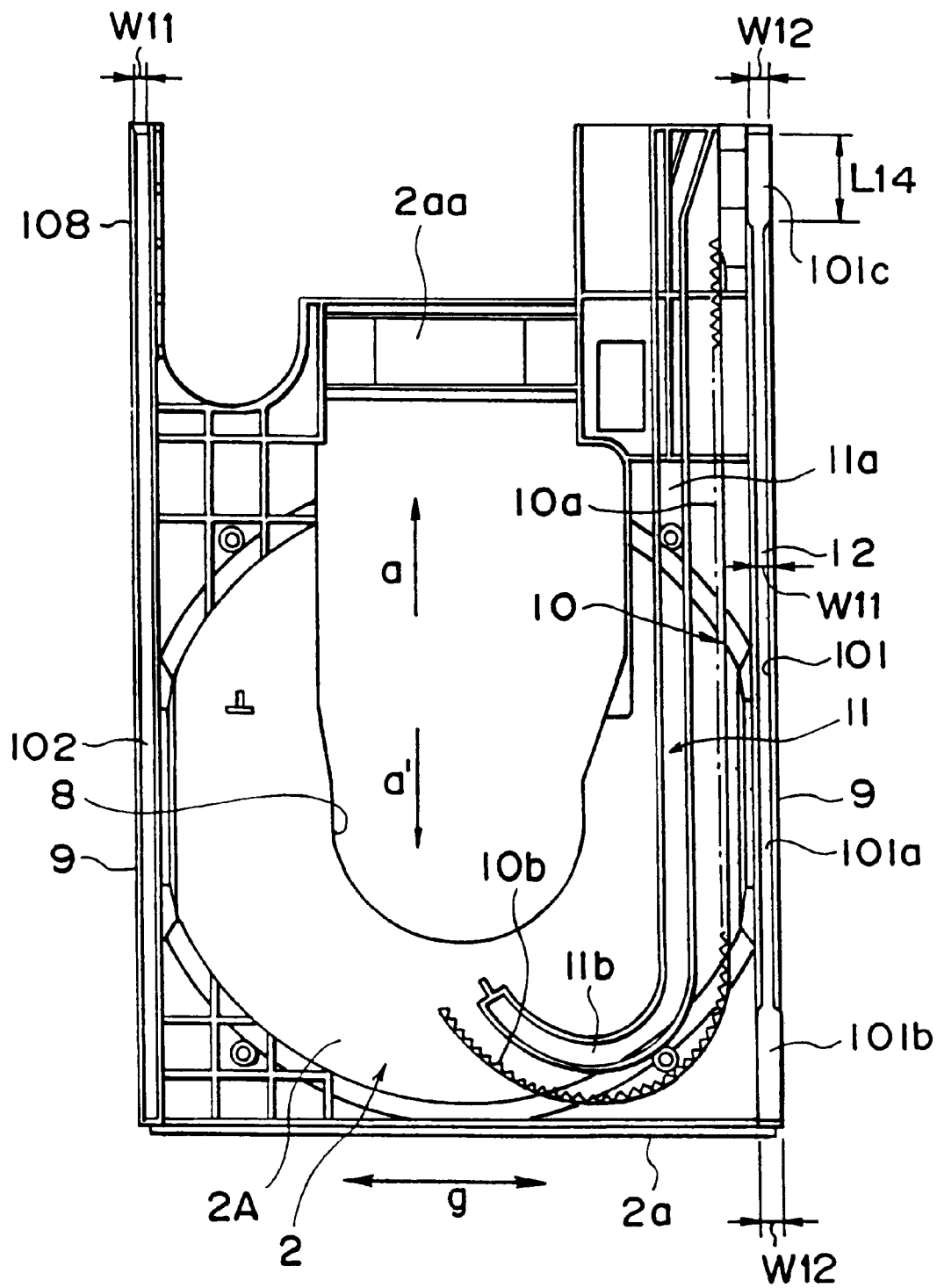
FIG. 27 is a bottom view for explaining a disk tray guide mechanism in the optical disk device to which the present invention is applied.

A structure for preventing the wobbling movement of the disk tray 2 during the recording and/or reproducing of the optical disk 1 will be described below with reference to FIGS. 26, 27 and 29.

A resiliently acting portion 108 capable of deforming in resilient fashion is integrally formed in one side of the rear end portion (end portion in the direction of arrow a) of the tray body 2A of the disk tray 2 which is formed of a synthetic resin. Then, a lateral pressure applying boss 109 which acts to relatively press a side surface of the resiliently acting portion 108 is integrally formed on the inner surface of one side plate 14a of the chassis 14 at a position near the rear panel 61.

Accordingly, as shown in FIG. 29, when the disk tray 2 is completely loaded into the disk device body 6 in the direction of arrow a, the side surface of the resiliently acting portion 108 at a rear end thereof (its end in the direction of arrow a') rides over a tip end of the lateral pressure applying boss 109 while flexing against its resiliency. This causes the resiliently acting portion 108 to produce a resilient repulsion force as a lateral pressure F applied to the disk tray 2. Under the lateral pressure F thus produced, one side surfaces of the main guide groove portion 101a and the sub-guide groove portion 101c of one slide guide groove 101 of the disk tray 2, shown in FIG. 31, are positively brought into pressure contact with the two main guide ribs 103B, 103C and then fixed in place.

As a result, in the completely loaded condition of the disk tray 2, the wobbling movement of the disk tray 2 within the disk device body 6 is suppressed to zero. It is therefore possible to prevent the disk tray 2 from the wobbling and causing noise during the recording and/or reproducing of the optical disk 1. Prevention of the wobbling movement of the disk tray 2 also contributes to avoiding generation of powdery dust and damage of parts due to abrasion of the synthetic resin. The optical disk device 5 with high quality and high durability can be realized.

[Description of Structure for Preventing Insertion of Foreign Matters Through Intake Ports in Front Panel]

A structure for preventing insertion of foreign matters through the plurality of elongate intake ports 74, which are formed in one horizontal line along the lower edge of the front panel 60, will be described below with reference to FIGS. 32 to 35.

A plurality of ribs 121 being substantially C-shaped in plan view are formed of a synthetic resin to project horizontally from and integrally with an inner surface 60a of the front panel 60 in which the plurality of intake ports 74 are formed. The ribs 121 each have a foreign-matter insertion preventing inner wall 122 formed to extend parallel to the front panel 60 and to face the inner side of each corresponding intake port 74 with an air sucking gap 123 left therebetween. The plurality of ribs 121 can be simply formed by protrusion molding at the same time as the plurality of intake ports 74. The air sucking gaps 123 defined between the plurality of foreign-matter insertion preventing inner walls 122 and the inner surface 60a of the front panel 60 are kept open through gaps above and below the ribs 121 and are communicated with the front end of the aforesaid intake passage 75.

Accordingly, open air sucked through the plurality of intake ports 74 upon operation of the ventilation fan 114 in the computer apparatus 111, as described above, can be introduced to the intake passage 75 from the air sucking gaps 123 after passing the gaps above and below the ribs 121. Then, the sucked open air can be smoothly discharged out of the disk device body 6 through the first and second discharge ports 76, 77.

When looking at the front panel 60 from the front (in the direction of arrow a), the plurality of intake ports 74 appear as being covered in the inner side thereof by the plurality of foreign-matter insertion preventing inner walls 122. Accordingly, the plurality of intake ports 74 appear as closed holes when viewed from the outside, and an appearance of the optical disk device 5 can be improved. In addition, even if children or other persons attempt to insert a foreign matter into the optical disk device 6 through any of the plurality of intake ports 74 by a tampering action, the insertion of the foreign matter is surely prevented by the presence of the foreign-matter insertion preventing inner walls 122; hence high safety can be ensured.

[Description of Dust Collecting Member Attached to Tray Entrance/Exit Opening]

A dust collecting member attached to the tray entrance/exit opening 4 in the front panel 60 will be described below with reference to FIGS. 32 and 33.

A dust collecting member 131 substantially in the form of a band is attached at its upper edge 131a by bonding or the like to the inner surface 60a of the front panel 60 along an entire upper edge of the tray entrance/exit opening 4 to extend horizontally. A lower edge 131b, i.e., a free end, of the dust collecting member 131 is held in contact with an upper surface 1b of the optical disk 1 which is loaded and unloaded in the directions of arrows a and a' with the disk tray 2. The dust collecting member 131 is formed of a material, such as unwoven cloth, foamed urethane and felt, having a dust collecting ability (to adsorb dirt and dust). The dust collecting member 131 serves also as a disk cleaning member.

Figure 33:
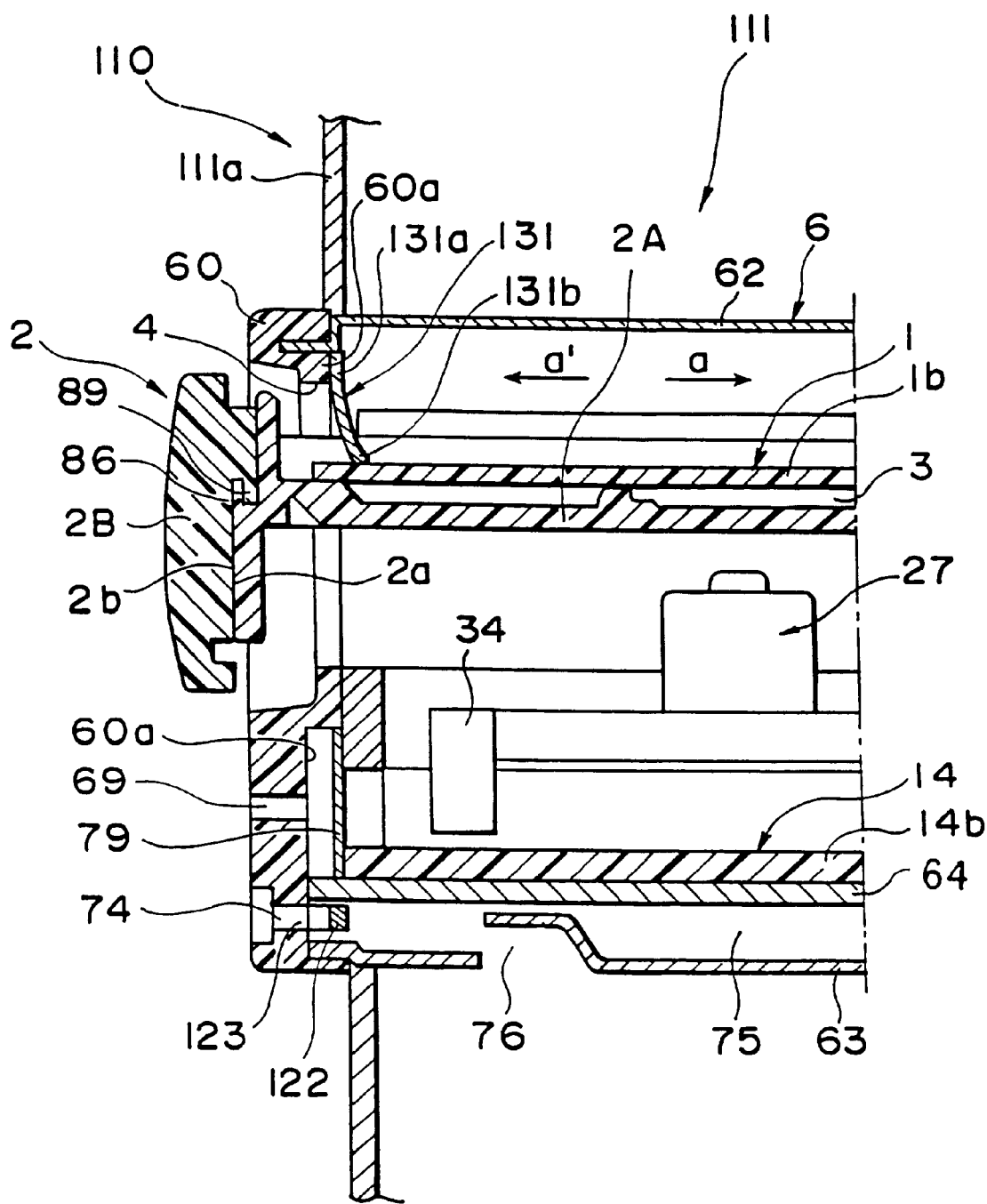
FIG. 33 is an enlarged side sectional view of principal part for explaining optical-disk automatically cleaning operation performed by the dust collecting member shown in FIG. 32.
Figure 34:
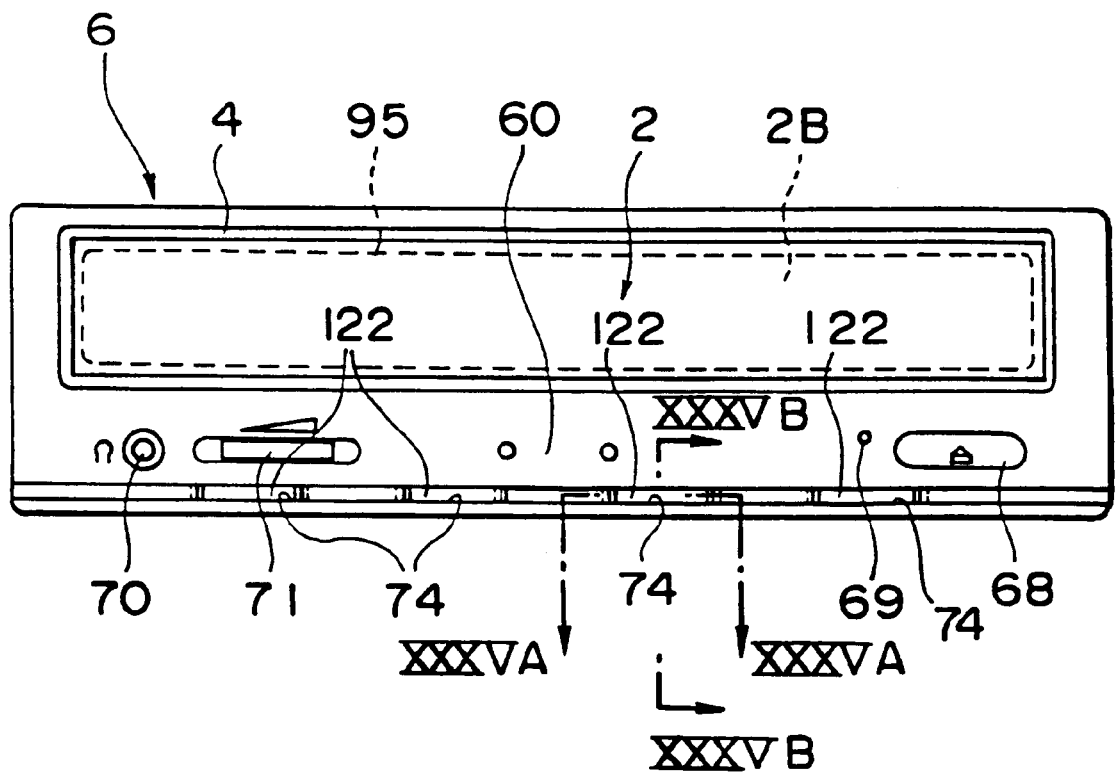
FIG. 34 is a front view of the front panel provided with the foreign-matter invasion avoiding inner wall.
Figure 35A:
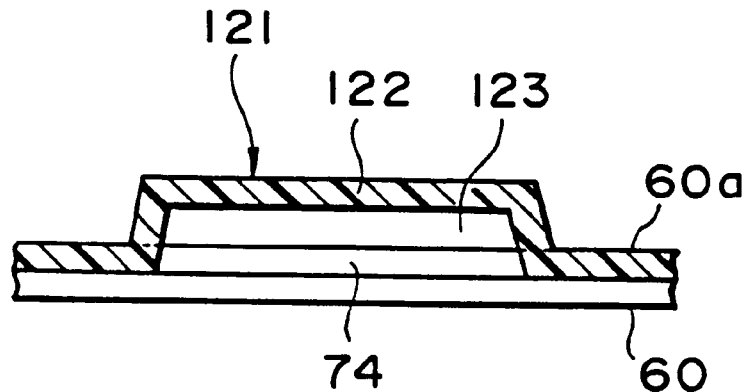
FIG. 35A is an enlarged sectional view taken along line C—C in FIG. 34, looking in a direction of arrow.
Figure 35B:
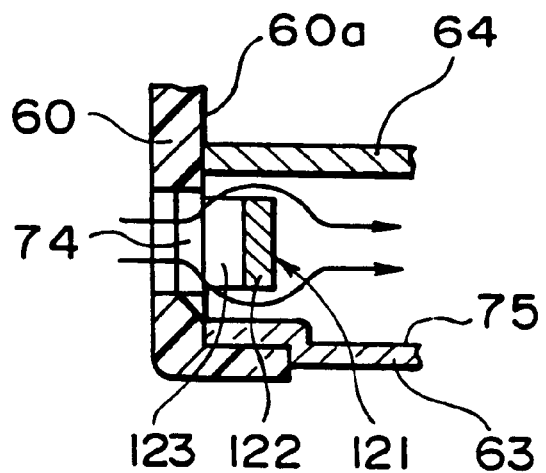
FIG. 35B is an enlarged sectional view taken along line D—D in FIG. 34, looking in a direction of arrow.

Accordingly, as shown in FIG. 33, when the optical disk 1 is loaded and unloaded into and from the disk device body 6 in the directions of arrows a and a' with the disk tray 2, the lower edge 131b of the dust collecting member 131 is relatively moved in the directions of arrows a and a' to wipe the upper surface 1b of the optical disk 1 for cleaning it. Dirt and dust adhering to the upper surface 1b of the optical disk 1 is adsorbed and removed by the dust collecting member 131.

Figure 32:
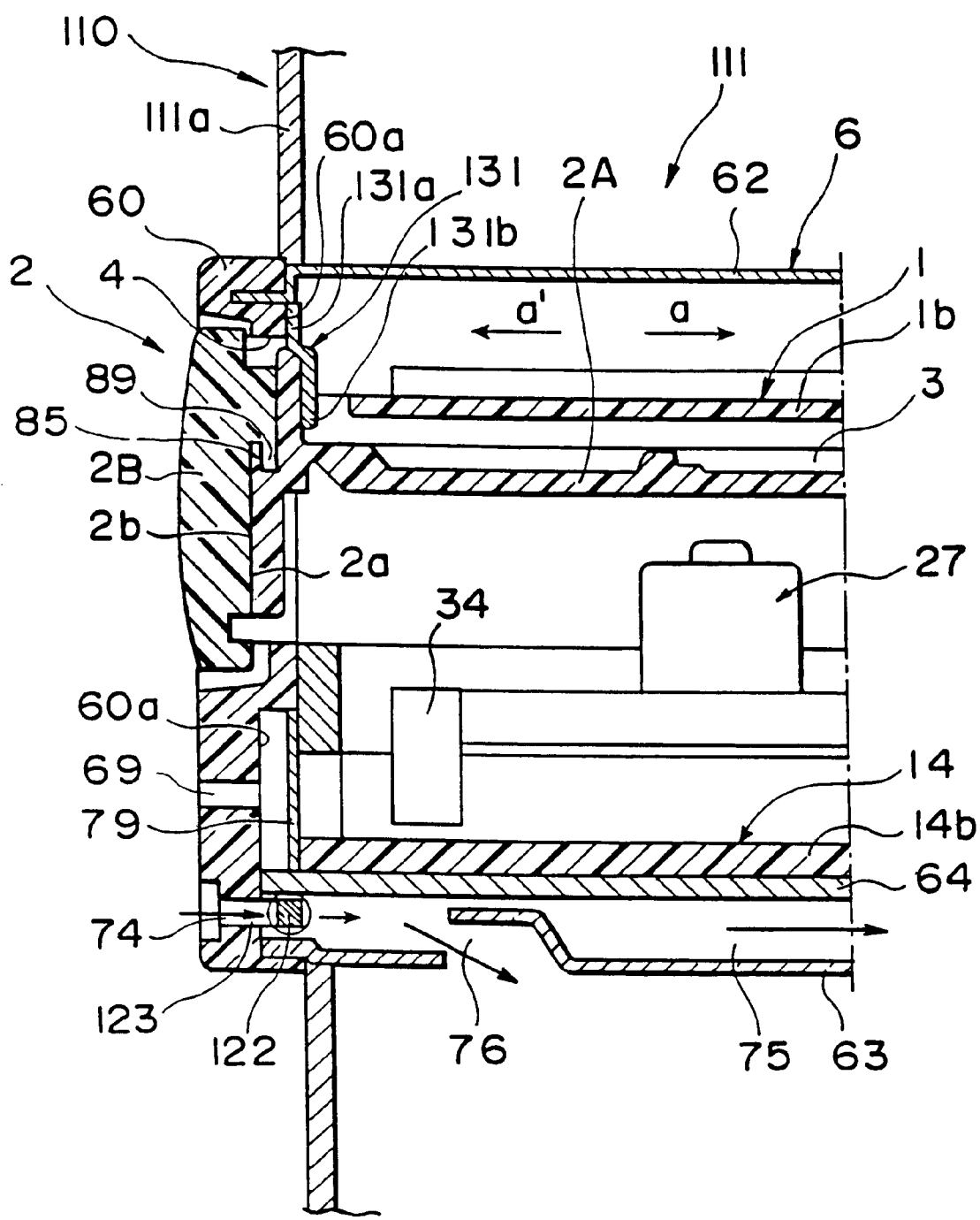
FIG. 32 is an enlarged side sectional view of principal part for explaining an inner wall disposed inside an intake port for avoiding invasion of foreign matters and a dust collecting member disposed inside a tray entrance/exit opening in the optical disk device to which the present invention is applied.

In addition, in the completely loaded condition of the optical disk 1, the dust collecting member 131 is positioned to close the tray entrance/exit opening 4 along its upper edge from the inside, as shown in FIG. 32. During the recording and/or reproducing of the optical disk 1, therefore, dirt and dust tending flow into the disk device body 6 through the tray entrance/exit opening 4 along its upper edge can be adsorbed and removed by the dust collecting member 131.

Consequently, the dirt and dust that have entered the disk device body 6 through the tray entrance/exit opening 4 along its upper edge during the recording and/or reproducing of the optical disk 1 are avoided as far as possible from adhering and depositing onto the upper surface 1b of the optical disk 1 and from deteriorating the recording and/or reproducing of data on and from the optical disk 1. In particular, therefore, a both-sided optical disk 1 such as a DVD (Digital Video Disk) can be stably recorded and/or reproduced with high accuracy. As an alternative, the dust collecting member 131 may be formed to have a rectangular shape in front view (as viewed in the direction of arrow a) to close the tray entrance/exit opening 4 along its entire periphery so that an upper portion of the rectangular dust collecting member 131 serves also as a disk cleaning member.

It is to be noted that the present invention has been described in connection with an embodiment, but the present invention is not limited to the above-described embodiment and can be modified in various ways based on the technical concept of the invention.

The disk device of the present invention thus constructed and a computer apparatus including the disk device have advantages as follows.

With the disk device according to the first aspect of the present invention, when the disk device is incorporated in a computer body of a computer apparatus for practical use and a ventilation fan is operated to discharge air in the computer body to the outside, open air can be vigorously sucked into the computer body from an intake port in the front panel, followed by passing through an intake passage and a discharge port. Accordingly, the air pressure in the intake port, the intake passage and the discharge port becomes higher than the air pressure in a disk loading space within the disk device body. Open air can be hence inhibited from being sucked into the disk loading space within the disk device body through a narrow gap between an inner periphery of the tray entrance/exit opening of the disk device body and a tray front panel, as well as narrow gaps left in an attachment hole of an eject button, an emergency hole, an earphone jack insertion hole, an attachment hole of a volume control, etc. It is therefore possible to avoid to the utmost such troubles that dirt and dust are sucked into the disk device body together with open air, and then adhere to the disk-shaped recording medium or adhere and deposit onto an objective lens of an optical pickup, a disk table, a carriage moving mechanism, etc., thereby causing an error in recording and/or reproducing of data. Consequently, a high dust-proof effect can be realized.

With the disk device according to the second aspect, a pair of right and left intake ports are formed in the front panel on both right and left sides of the tray entrance/exit opening, and a pair of right and left intake passages, which are formed between right and left side plates of a chassis and right and left side plates of a cover, are communicated respectively with the pair of right and left intake ports. Therefore, open air can be smoothly sucked and discharged through the intake ports and the intake passage in linear fashion, while the pair of right and left intake passages are completely isolated from the interior of the disk device body with ease. As a result, the dust-proof effect can be further enhanced.

With the disk device according to the third aspect, since an intake port is formed in the front panel along a lower edge of the tray entrance/exit opening and an intake passage formed between a lower cover of the disk device body and a printed board positioned above the lower cover is communicated with the intake port, the intake port can be formed to have a large area along the lower edge of the tray entrance/exit opening and open air can be vigorously sucked into the intake passage from the intake port, resulting in a high dust-proof effect. The open air vigorously flowing through the intake passage serves also to effectively air-cool electric circuit elements mounted on the printed board.

With the disk device according to the fourth aspect, since the discharge port formed in the intake passage comprises a first discharge port positioned near the intake port and a second discharge port formed rearward of the first discharge port, the open air sucked from the intake port can be quickly discharged through the first discharge port near the intake port, which reduces a risk that dirt and dust sucked together with open air may advance through the intake passage and then enter the disk device body. Consequently, a higher dust-proof effect can be realized.

With the disk device according to the fifth aspect, since dirt and dust in open air can be collected by a dust collecting filter disposed in the intake passage, it is also possible to avoid dirt and dust from entering a computer body and to realize a higher dust-proof effect.

With the disk device according to the sixth aspect, since a foreign-matter insertion preventing inner wall is provided inside the intake port in the front panel with an air sucking gap left between the inner wall and the intake port, insertion of foreign matters through the intake port can be prevented while the intake port is allowed to develop a sufficient air sucking ability, and therefore high safety is ensured. In addition, since the intake port appears as a closed hole by the presence of the inner wall when viewed from the outside, an appearance of the disk device can be improved.

With the disk device according to the seventh aspect, in the disk device wherein the intake port in the front panel is communicated with the intake passage formed inside a cover of the disk device body and open air sucked into the intake passage from the intake port is discharged to the outside of the cover through a discharge port formed in the intake passage, a foreign-matter insertion preventing inner wall is provided inside the intake port in the front panel with an air sucking gap left between the inner wall and the intake port. It is therefore possible to prevent the intake passage from being clogged with foreign matters inserted through the intake port, and to ensure a discharging ability sufficient to smoothly discharge open air containing dirt and dust to the outside of the disk device body.

With the disk device according to the eighth aspect, since a foreign-matter insertion preventing inner wall is formed of a synthetic resin integrally with an inner surface of the front panel, the disk device can be easily manufactured and not only the number of parts but also the number of assembly steps can be reduced, thus resulting in a reduced cost.

With the disk device according to the ninth aspect, since a dust collecting member for collecting dirt and dust coming through the tray entrance/exit opening is provided, dirt and dust coming through the tray entrance/exit opening together with open air can be collected by the dust collecting member during the recording and/or reproducing of a disk-shaped recording medium. It is therefore possible to avoid such a trouble that dirt and dust flow into the disk device through the tray entrance/exit opening and then adhere and deposit onto the disk-shaped recording medium, thereby deteriorating the quality of recording and/or reproducing of data.

With the disk device according to the tenth aspect, the dust collecting member provided inside the front panel is relatively moved to wipe an upper surface of the disk-shaped recording medium when the medium is loaded and unloaded into and out of the disk device body with the disk tray, so that the dust collecting member serves also as a disk cleaning member. Accordingly, dirt and dust adhering to the disk-shaped recording medium can be removed by automatic cleaning.

With a computer apparatus according to the eleventh aspect, since the disk device having a dust-proof function is incorporated in a computer body and the intake port of the disk device is opened to the outside of a front panel of the computer body, dirt and dust contained in open air and sucked into the computer body are not easily sucked into the disk device body; hence a satisfactory dust-proof effect can be achieved.

What is claimed is:

1. A disk device comprising:
    a disk device body having a front panel provided with a tray entrance/exit opening formed therein;
    a cover configured to cover said disk device body, said cover including an upper cover and a lower cover;
    chassis provided inside of said disk device body;
    printed circuit boards fixed to a bottom of said chassis;
    a disk tray configured to load and unload a disk-shaped recording medium into and out of, respectively, said disk device body through said tray entrance/exit opening;
    at least one intake port formed in said front panel of said disk device body outside of said tray entrance/exit opening;
    at least one intake passage formed as a gap inside of said cover of said disk device body and having a front end which communicates with said at least one intake port, wherein said gap is bounded on a bottom thereof by a top surface of said lower cover and on a top thereof by a bottom surface of said printed circuit boards so that together said lower cover and said printed circuit boards form said at least one intake passage;

a discharge port formed in said at least one intake passage and opened to an outside of said cover through an aperture in said lower cover near said at least one intake port; and an intake passage narrowing member located adjacent to said aperture in said lower cover, said intake passage narrowing member narrowing said at least one intake passage at a location near said aperture in order to divert most of an air flow from said at least one intake port to said outside of said disk device body, said intake passage narrowing member being formed by bending a portion of said lower cover into said at least one intake passage so that a first part of said portion of said lower cover is near to and parallel with a bottom of one of said printed circuit boards and a second part of said portion of said lower cover is diagonally between said first part and a remainder of said lower cover.

2. The disk device according to claim 1, wherein said at least one intake port is a pair of intake ports on each of right and left sides of said tray entrance/exit opening, and wherein said at least one intake passage is a pair of right and left intake passages which are formed in said disk device body between right and left side plates of said chassis and right and left side plates of said cover.

3. The disk device according to claim 1, further comprising a dust collecting filter disposed inside of said at least one intake port or in said at least one intake passage.

4. The disk device according to claim 1, further comprising a foreign-matter insertion preventing inner wall arranged inside said at least one intake port and an air sucking gap located between said foreign-matter insertion preventing inner wall and said at least one intake port.

5. The disk device according to claim 4, wherein said foreign-matter insertion preventing inner wall is formed of a synthetic resin integrally with an inner surface of said front panel of said disk device body.

6. A computer apparatus comprising the disk device according claim 1, wherein said computer apparatus includes a computer body, and a fan for discharging air in said computer body to an outside, and wherein said disk device is incorporated into said computer apparatus inside of a front panel of said computer body so that said at least one intake port of said disk device opens to an outside of said front panel of said computer body and said discharge port opens to an inside of said computer body.

7. The disk device of claim 1, wherein an area of said opening is set as large as possible and said discharge port is positioned as close as possible to said at least one intake port so that dirt or dust sucked into said at least one intake passage through said at least one intake port can be discharged to said outside of said disk device body as quickly as possible and avoid going further into said at least one intake passage and then enter a disk loading space from an approximate middle of said at least one intake passage.

* * * * *

UNITED STATES PATENT AND TRADEMARK OFFICE
CERTIFICATE OF CORRECTION

PATENT NO.    : 6,426,932 B2
DATED         : July 30, 2002
INVENTOR(S)   : Kiyoshi Omori et al.

It is certified that error appears in the above-identified patent and that said Letters Patent is hereby corrected as shown below:

Column 2,
Line 4, change "clampers" to -- dampers --.

Column 6,
Line 35, insert -- to -- after the word "listen".

Column 7,
Lines 9 and 10, change "adversely affected and such a problem as causing a trouble in seek and tracking is more likely to occur." to -- adversely affected. Such an occurrence may cause trouble in seek and tracking. --
Line 39, change "be hence" to -- hence be --.

Column 9,
Lines 4 and 7, change "showing an" to -- showing a --.

Column 10,
Line 63, change "be hence" to -- hence be --.

Column 11,
Line 33, change "midway the" to -- midway to the --.

Column 12,
Line 28, change "lug.89" to -- lug 89 --.

Signed and Sealed this

Nineteenth Day of August, 2003

JAMES E. ROGAN
*Director of the United States Patent and Trademark Office*